US008548257B2

(12) United States Patent
Reid et al.

(10) Patent No.: US 8,548,257 B2
(45) Date of Patent: Oct. 1, 2013

(54) DISTINGUISHING BETWEEN FACES AND NON-FACES

(75) Inventors: Russell Reid, Palo Alto, CA (US); Nikhil Bhatt, Cupertino, CA (US); Ben Weiss, Carpinteria, CA (US)

(73) Assignee: Apple Inc., Cupertino, CA (US)

( * ) Notice: Subject to any disclaimer, the term of this patent is extended or adjusted under 35 U.S.C. 154(b) by 888 days.

(21) Appl. No.: 12/567,524

(22) Filed: Sep. 25, 2009

(65) Prior Publication Data

US 2010/0172579 A1     Jul. 8, 2010

Related U.S. Application Data

(63) Continuation-in-part of application No. 12/360,112, filed on Jan. 26, 2009, and a continuation-in-part of application No. 12/360,110, filed on Jan. 26, 2009.

(60) Provisional application No. 61/142,606, filed on Jan. 5, 2009.

(51) Int. Cl.
*G06K 9/62* (2006.01)
(52) U.S. Cl.
USPC .......................... 382/224; 382/118; 382/165
(58) Field of Classification Search
USPC .............. 382/118, 162, 165, 190, 195, 224, 382/263, 274
See application file for complete search history.

(56) References Cited

U.S. PATENT DOCUMENTS

| 6,297,846 | B1 * | 10/2001 | Edanami | 348/239 |
|---|---|---|---|---|
| 6,728,401 | B1 | 4/2004 | Hardeberg | |
| 7,190,829 | B2 | 3/2007 | Zhang et al. | |
| 7,916,905 | B2 | 3/2011 | Yen et al. | |
| 7,929,771 | B2 | 4/2011 | Ko et al. | |
| 2003/0179911 | A1 | 9/2003 | Ho et al. | |
| 2003/0185424 | A1 | 10/2003 | Sato et al. | |
| 2005/0031173 | A1 | 2/2005 | Hwang | |
| 2005/0074167 | A1 * | 4/2005 | Maeda et al. | 382/190 |
| 2005/0265603 | A1 * | 12/2005 | Porter et al. | 382/190 |
| 2006/0029265 | A1 | 2/2006 | Kim et al. | |
| 2006/0115174 | A1 | 6/2006 | Lim et al. | |

(Continued)

FOREIGN PATENT DOCUMENTS

EP         1128316         2/2006

OTHER PUBLICATIONS

PCT Search Report for PCT/US2010/020141, dated Jul. 14, 2011, 7 pages.

(Continued)

*Primary Examiner* — Phuoc Tran
(74) *Attorney, Agent, or Firm* — Wong, Cabello, Lutsch, Rutherford & Brucculeri, LLP

(57) ABSTRACT

Methods, systems, and apparatus, including computer program products, for evaluating image data. In one aspect, a method includes accessing an image that includes a candidate face, such as a face detected during a face detection operation. The method further includes generating a sharpness measure based on image data corresponding to the candidate face, evaluating the sharpness measure to determine a confidence score representing a likelihood that the candidate face corresponds to a human face, and accepting the candidate face when the confidence score compares in a predetermined manner to a confidence threshold. Additionally, the method can be implemented to include generating a skin tone measure based on image data corresponding to the candidate face and evaluating the sharpness measure in combination with the skin tone measure to determine the confidence score.

30 Claims, 13 Drawing Sheets

(56) References Cited

U.S. PATENT DOCUMENTS

| | | |
|---|---|---|
| 2006/0204034 A1 | 9/2006 | Steinberg et al. |
| 2006/0204055 A1* | 9/2006 | Steinberg et al. ............ 382/118 |
| 2007/0065006 A1 | 3/2007 | Wilensky |
| 2007/0110305 A1 | 5/2007 | Corcoran et al. |
| 2007/0165961 A1 | 7/2007 | Lu |
| 2007/0183661 A1* | 8/2007 | El-Maleh et al. ............ 382/173 |
| 2007/0237364 A1 | 10/2007 | Song et al. |
| 2008/0013851 A1 | 1/2008 | Ishiwata et al. |
| 2008/0056580 A1 | 3/2008 | Okada et al. |
| 2008/0095445 A1 | 4/2008 | Brandt |
| 2009/0060373 A1 | 3/2009 | Perera et al. |
| 2010/0302272 A1 | 12/2010 | Reid et al. |
| 2010/0303345 A1 | 12/2010 | Reid et al. |

OTHER PUBLICATIONS

Hu et al., "Low Cost Robust Blur Estimator," Oct. 2006, IEEE, pp. 617-620.

Hu et al., "Adaptive Image Restoration Based on Local Robust Blur Estimation." 2007, Springer, pp. 461-472.

PCT Search Report for PCT/US2010/020141, dated Mar. 29, 2010, 14 pages.

Jin et al., "Face detection using template matching and skin-color information," Neurocomputing, Elsevier Science Publishers, Amsterdam, NL, vol. 70, No. 4-6, Jan. 9, 2007.

* cited by examiner

DISTINGUISHING BETWEEN FACES AND NON-FACES

This application is a continuation-in-part of U.S. patent application Ser. No. 12/360,110, filed on Jan. 26, 2009, entitled "Detecting Image Detail Level," and also is a continuation-in-part of U.S. patent application Ser. No. 12/360,112, filed on Jan. 26, 2009, entitled "Detecting Skin Tone In Images," and also claims the benefit of U.S. Provisional Application No. 61/142,606, filed Jan. 5, 2009, the disclosure of each of which is considered part of and are incorporated by reference in the disclosure of this application.

TECHNICAL FIELD

The present disclosure relates to facial detection in digital images, and to evaluating whether a detected face corresponds to a human face based on one or more image measures, including sharpness, skin tone, and head-tilt angle.

BACKGROUND

Digital photography, a popular pastime, utilizes digital technology to produce digital images. Digital images (or "images") also can be created, for example, by graphical editing software (e.g., photo editing or drawing software), digital video equipment, and scanners.

After production, an original image (e.g., a photograph) can be processed in many ways. Some instances of image processing can produce a new image from an original image. For example, cropping (i.e., extracting a portion of an image) and transforming (e.g., convolving an image with a convolution kernel) can produce a new image from an original image. Other instances of image processing can ascertain information about an original image without producing a new image. For example, facial-detection processing can determine whether an image depicts one or more faces.

Images (e.g., photographs) can depict one or more subjects, such as people or objects, with varying levels of detail. A sharp image, having a high level of detail, can include visual features (e.g., fine details of a flower) that would not be discernible in an image with a comparatively low level of detail. Further, image detail can correspond to image components of varying frequencies (e.g., high frequency or low frequency).

SUMMARY

This disclosure describes technologies and techniques for evaluating detected faces associated with digital images.

The present inventors recognized a need to assess an image portion identified as including a face to determine whether a human face (or face) was correctly detected. Further, the need to generate one or more measures based on image characteristics, such as sharpness and skin tone, for an image portion identified as including a detected face also was recognized. Additionally, the present inventors also recognized the need to use a combination of measures to accurately distinguish between human faces and non-faces.

The present inventors also recognized the need to evaluate sharpness in an image in combination with one or more other measures. The need to perform sharpness analysis in accordance with directional information corresponding to a composite face also was recognized. The need to generate measures, e.g. sharpness, for portions of a detected face also was recognized. Further, the present inventors recognized the need to utilize a common sharpness, or edge, scale for both detected faces and reference faces, including composite faces. Additionally, the present inventors recognized the need to tune a face verification processor using a library of detected faces.

In general, one aspect of the subject matter described in this specification can be implemented to include accessing an image that includes a candidate face, generating a sharpness measure based on image data corresponding to the candidate face, evaluating the sharpness measure to determine a confidence score representing a likelihood that the candidate face corresponds to a human face, and accepting the candidate face when the confidence score compares in a predetermined manner to a confidence threshold.

This and other implementations can optionally include one or more of the following features. The subject matter can be implemented to include generating, for an image portion associated with the candidate face, a total sharpness score representing a difference between a lateral sharpness value, determined by evaluating across one or more edges occurring in a typical or a composite face, and a corresponding longitudinal sharpness value, determined by evaluating along one or more edges occurring in a typical or a composite face. Further, the subject matter can be implemented to include generating the sharpness measure in accordance with data associated with a composite face. The subject matter also can be implemented to include determining, for an image portion associated with the candidate face, a sharpness value across facial characteristics indicated by the composite face and a sharpness value along facial characteristics indicated by the composite face and determining a difference between the sharpness value across facial characteristics and the sharpness value along facial characteristics to generate the sharpness measure. Also, the subject matter can be implemented to include generating, for the image portion, a second sharpness measure representing a difference between a lateral sharpness value and a corresponding longitudinal sharpness value and evaluating, in combination, the sharpness measure and the second sharpness measure to determine the confidence score. Further, the subject matter can be implemented to include generating a skin tone measure based on image data corresponding to the candidate face and evaluating the sharpness measure in combination with the skin tone measure to determine the confidence score. Evaluating the sharpness measure in combination with the skin tone measure further can be implemented to include assigning a weighting factor to at least one of the sharpness measure and the skin tone measure. Additionally, the subject matter can be implemented such that the confidence threshold represents a dynamic threshold value.

In general, in another aspect, the subject matter can be implemented to include accessing an image that includes a candidate face, scaling the candidate face in accordance with a predetermined standard size to generate a scaled candidate face, generating a sharpness measure and a skin tone measure based on the scaled candidate face, evaluating the sharpness measure and the skin tone measure to determine a confidence score, and accepting the candidate face when the confidence score compares in a predetermined manner to a confidence threshold.

In general, in still another aspect, the subject matter can be implemented in a system including a computer-readable medium storing an image that includes a candidate face and a computing system including processor electronics configured to perform operations including accessing the candidate face, generating a sharpness measure and a skin tone measure based on image data corresponding to the candidate face, evaluating the sharpness measure and the skin tone measure to determine a confidence score representing a likelihood that the candidate face corresponds to a human face, and accepting the candidate face when the confidence score compares in a predetermined manner to a confidence threshold. Further, any of the disclosed aspects can be implemented as methods, computer program products, and systems, and features disclosed with respect to one aspect can be implemented in other aspects.

The techniques described in this specification can be implemented to realize one or more of the following advantages. A detected face identified by an application or processor can be further analyzed to increase the likelihood that the detected face is a human face. An image location identified as including a detected face can be evaluated using one or more measures to determine whether the detected face includes characteristics that correspond to a human face. The measures can be based on image characteristics including sharpness, skin tone, and head-tilt angle. Further, a measure corresponding to a particular characteristic, e.g. sharpness, can be determined using one or more predetermined techniques. The accuracy of facial detection can be improved by identifying images in which an initially detected face likely does not or actually does not correspond to a human face. Also, aspects of image detail level detection (e.g., image transformation and image comparison) can increase overall processing-resource efficiency and can be used in real-time systems.

One or more of the following additional advantages also can be realized. A single color channel can be used for image detail level detection rather than multiple color channels included in the original image to provide several advantages. For example, using one channel can decrease the image data (e.g., an 8-bit grayscale image rather than a 24-bit color image) to be processed thus decreasing the computing resources required. In another example, a given channel (e.g., the green or red channel) can include less noise than the original image improving the quality of the detail level detection. Further, a training library of verified faces can be used to calibrate an application or processor that evaluates detected faces, such that an accurate evaluation can be performed. In some instances, the training library can be a reference library containing a large number of pre-verified images, each including one or more detected faces. In some other instances, a verified portion of a user's image collection can be used as a training library. Thus, a face verification application or processor can be tuned to evaluate detected faces using a broad range of data or data that is representative of faces that are likely to be processed by a particular device.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Facial detection includes processing to detect one or more faces in an image. Further, facial detection can include identifying one or more areas of an image in which a face is believed to appear. Facial recognition, in contrast, can include determining, based on a detected face, which person is represented.

Certain detection conditions can result in unreliable facial recognition. For example, a detected face, such as a face in a background of an image, can lack sufficient detail to enable accurate recognition. In a second example, an area in which a face has been "detected" can actually correspond to image data that represents something other than a face (e.g., clouds or leaves on a tree).

Determining an image detail level can assist in recognizing detection conditions likely to lead to unreliable facial recognition. An area of an image in which a detected face is believed to appear can be processed to assess the level of image detail. For example, the area can be extracted from the image as a new, smaller image. Further, a value (or score) can be generated that reflects the level of image detail of the area.

A component of the level of detail in an image can relate to a sharpness quality of the image. Sharpness can be a measure of change in luminosity divided by a change in distance. Luminosity can refer to the intensity or brightness of an image. Distinguishing between luminosity changes that indicate sharpness and changes that do not indicate sharpness can improve the accuracy of detecting image detail level.

Figure 1:
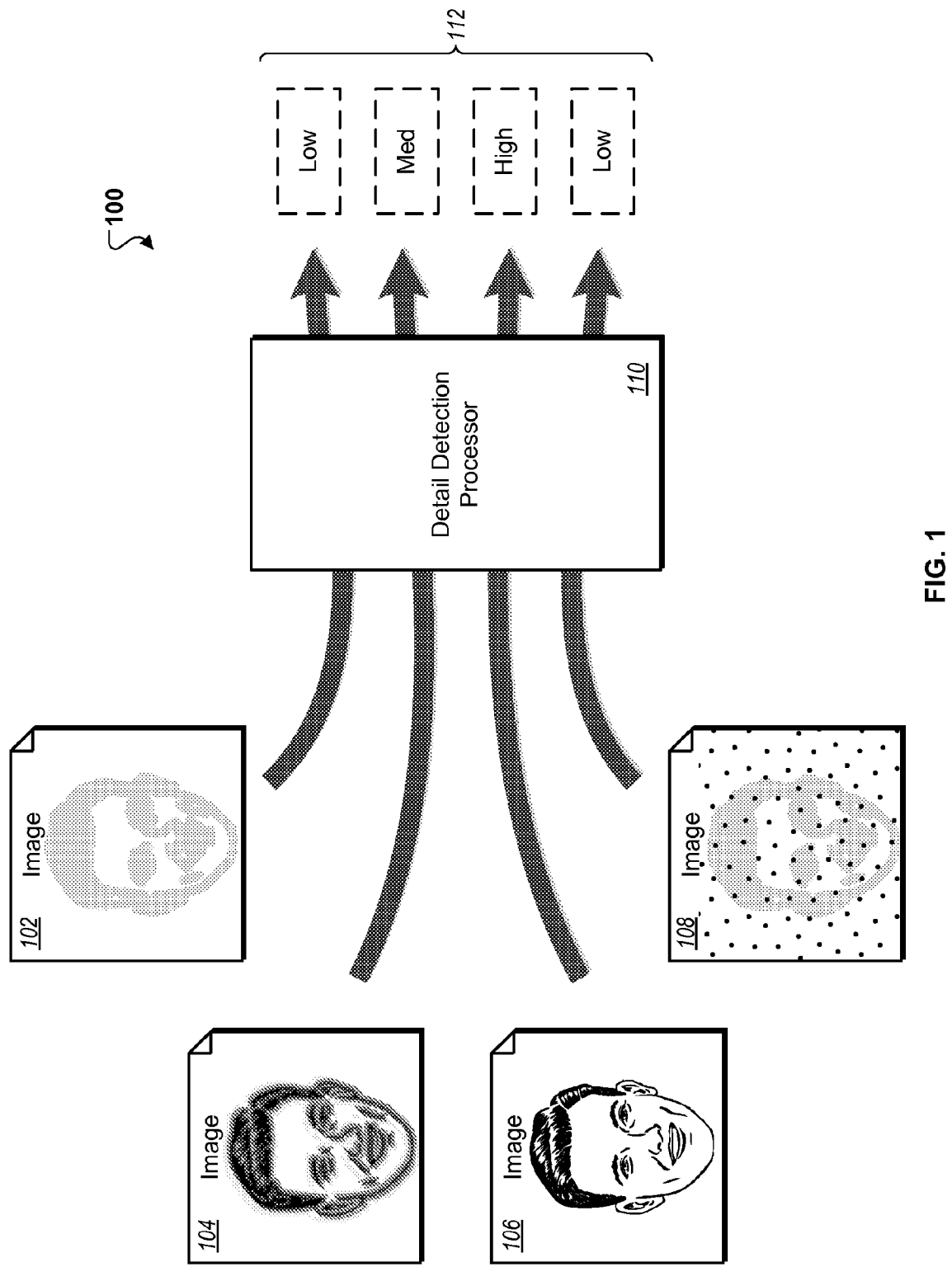
FIG. 1 shows an exemplary overview of detecting image detail levels.

In some instances, as represented in FIG. 1, an image or portion thereof can clearly depict a given subject matter. For example, an image (e.g., a photograph) of a person's face can show facial features, such as the eyes, nose, and mouth that enable a person or facial recognition process to recognize the person depicted. In other instances, an image or portion thereof can depict a given subject in an unclear manner. For example, the lack of detail can result from a photograph being blurry (e.g., out of focus), washed out (e.g., overexposed), distorted (e.g., noisy), or blank. Further, the lack of detail can prevent a person or facial recognition process from recognizing what an image depicts. Thus, image detail detection processing can be performed to determine either or both of the clarity and accuracy of an image's depictions.

FIG. 1 shows an exemplary overview of detecting image detail levels. A washed-out image 102, a blurry image 104, a clear image 106 and a noisy image 108 shown in detail detection system 100 can be digital images that represent a subject (e.g., a person or physical object), and also can be still images (e.g., photographs) or frames from a video source. The images (e.g., the washed-out image 102 can be portions extracted from one or more larger images.

In general, the washed-out image 102 depicts a face with relatively little detail (e.g., the white of the eyes and teeth are not visible). The lack of detail in the washed-out image 102 can be caused by various factors. For example, the face may have been too bright relative to the exposure level of a camera producing the washed-out image 102. Other photographic defects, such as aberrations of camera optics (e.g., astigmatism), also can result in unclear images.

With respect to image characteristics, the washed-out image 102 can represent an image that, in a frequency domain representation, has a relatively low ratio of high frequency to low frequency components. In contrast, an image that has a relatively high ratio of high frequency to low frequency image components can be perceived as having a sharp appearance. The lack of high frequency image data in the washed-out image 102 can result in edges and fine details (e.g., the eyes of the person) being more difficult to perceive or detect relative to an image having a higher ratio. The washed-out image 102 can, however, have low frequency image components such that the general shape of the person's face is represented.

A blurry image 104 depicts a face having details which are distorted or unclear due to blurring. The blurring can result from the face not having been in focus (e.g., a part of the background) when the blurry image 104 was captured. Focus can refer to the convergence of light from the subject, e.g., in the optical systems of a camera. The blurring also can result from, e.g., camera or subject movement, image processing or too little resolution to approximate the features of the face.

The blurry image 104 can include more detail than the washed-out image 102. For example, the ratio of high frequency to low frequency components can be higher for the blurry image 104, resulting in more clarity. However, the blurry image 104 nonetheless can be undesirable or of low quality because the face depicted lacks sharpness.

A clear image 106 depicts a face with many perceptible details. For example, details, such as of the hair, eyes, mouth, and facial shape, can be clearly perceived and distinguished from other details. The clear image 106 can include sufficient high frequency and low frequency components to enable identity recognition, e.g., by a person or computer recognition system.

A noisy image 108 depicts a face with relatively little detail that includes noise (e.g., camera noise or film grain). The noise can be random variation in brightness or color information in the image 108. Image noise can originate in film grain or in electronic noise in the input device (e.g., digital camera) sensor and circuitry. Image noise can be, e.g., most apparent in images with low signal levels (e.g., dark or underexposed images).

When evaluated in a frequency domain representation, the noise can cause the noisy image 108 to appear to have more high frequency components than is actually the case. For example, the random variations in brightness or color can mimic image detail based on, e.g., the rapid changes in contrast or brightness over a small space. However, such pseudo high frequency image data does not make a face more recognizable, and can instead further distort a face. Therefore, high frequency image components can be an unreliable indication of an image detail level.

A detail detection processor 110 can be configured to perform detail detection processing. The detail detection processor 110 can be implemented by a computer executing instructions, logic circuitry, or a combination thereof. Detail detection processing can include receiving an image as input, determining the level of detail represented in the image, and providing information on the level of detail as output. The detail detection processor 110 can transform electronic information representing a digital image into other forms (e.g., new images) for ascertaining a detail level.

A detail detection result 112 can be output by the detail detection processor 110 and can indicate the level of detail in an image. In some implementations, the detail detection result 112 can be one of an enumerated list of options (e.g., "High," "Med," or "Low," or "True," or "False"). In some other implementations, the detail detection result 112 can be a number representing the level of image detail on a given scale (e.g., 1-10, 1-1000, or 0.0-1.0). Any value or representation can be utilized to indicate the level of detail detected in an image.

In operation, an image, such as the blurry image 104, can be input to the detail detection processor 110. Further, a corresponding detail detection result 112 can be output, which indicates the level of detail in the input. Based on the blurriness of the blurry image 104, the detail detection result 112 can reflect a detail level of medium (i.e., "Med"). A clear image 106 also can be input to the detail detection processor 110. Based on the sharpness of the clear image 106, the detail detection processor 110 can determine the detail level to be high 112. Similarly, it can be determined based on lack of detail that the unclear image 102 has a low detail level 112 and that the noisy image 108 has a low detail level 112.

Figure 2:
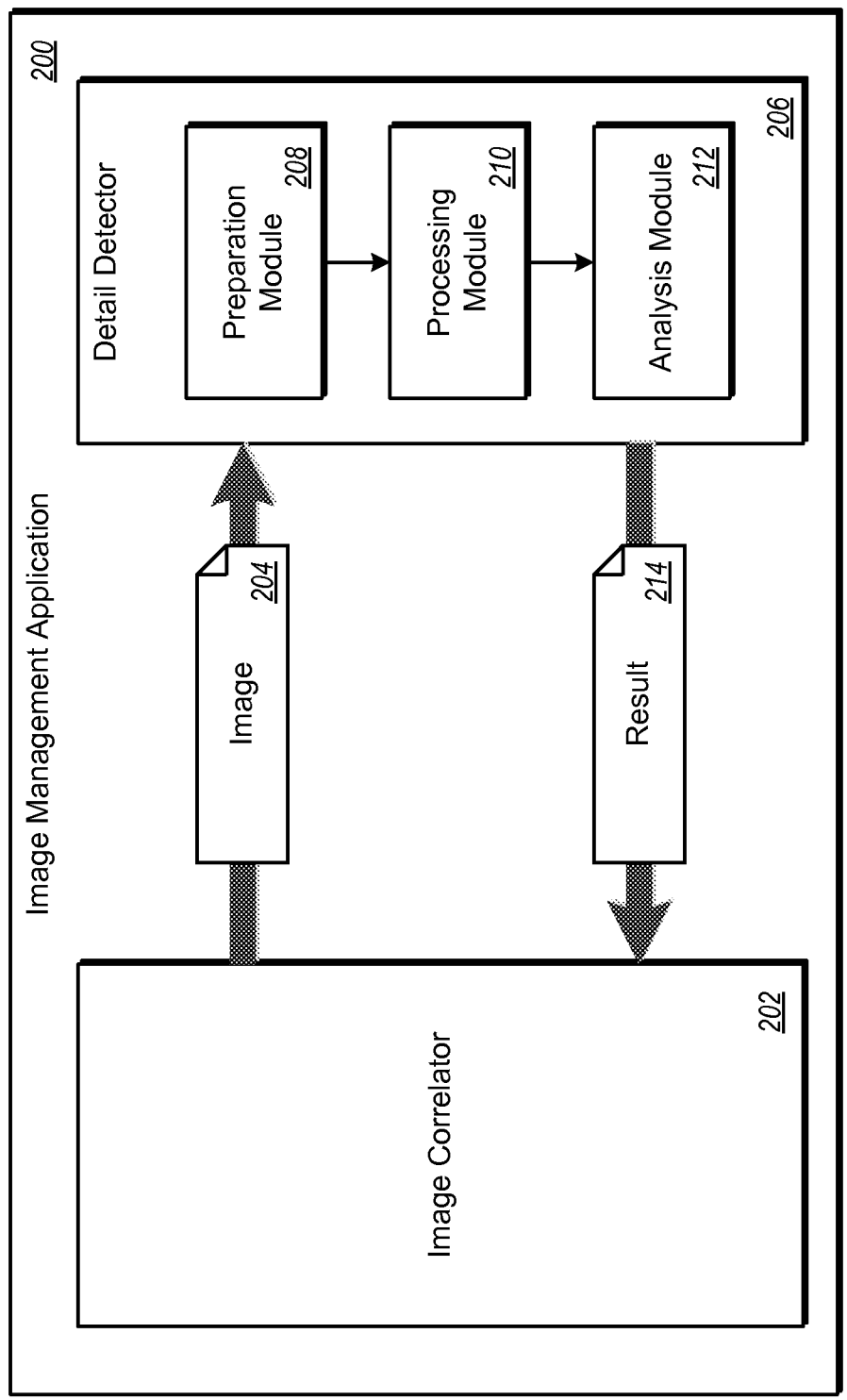
FIG. 2 shows an exemplary image management application for detecting image detail levels.

In general, as shown in FIG. 2, a system can include a component that receives as input an image and generates a result indicating the level of detail of the image.

FIG. 2 shows an exemplary image management application 200 for detecting image detail levels. The image management application 200 can be a software application executing on a computer system. The image management application 200 can access resources of the computer system (e.g., memory or disk storage) via an operating system or application platform. The image management application 200 can include a user-interface through which the image management application 200 receives input from a user and displays output to the user. Although shown as a single application, in some implementations the functionality of the image management application 200 can be accomplished using multiple applications.

The image management application 200 can include software systems or modules, such as an image correlator 202 and a detail detector 206. The image management application 200 can enable software components to exchange information. The software components can be independent processes (e.g., threads) operating within the image management application 200, remote functions (e.g., invoked using a remote procedure call), or local functions (e.g., methods or procedures) called by a control process of the image management application 200.

An image correlator 202 can be an application, process, or system component configured to correlate images. For example, the image correlator 202 can correlate images of a same individual using facial detection and facial recognition functionality. Further, the image correlator 202 can, e.g., have confidence levels for the facial detection and the facial recognition functions. As part of assessing a confidence level, the image correlator 202 can use reliability indications (e.g., a detail-level result 214 generated by the detail detector 206).

An input image 204 represents a digital image. For example, the input image 204 can be data stored in memory or a file system according to a format (e.g., bitmap, pixmap, vector graphics, compressed, or uncompressed). The input image 204 can be transferred from the image correlator 202 to the detail detector 206, e.g., by value or by reference. Transferring by value can include copying the input image 204 to an area of memory for use by the detail detector 206. Transferring by reference can include passing only a reference (e.g., a memory or file pointer) for the image data to the detail detector 206. The detail detector 206 can thus access the image from a location common to the image correlator 202.

The detail detector 206 can be an application, process, or system component configured to detect the level of detail of an input image 204 received from another application, process, or system component, such as the image correlator 202. The detail detector 206 can be configured to detect details and detail levels in input images, such as the input image 204, having certain characteristics. For example, images input to the detail detector 206 can depict faces having an approximate size relative to the input image 204. The characteristics can provide information that enables the detail detector 206 to use more sophisticated techniques in detecting detail levels than possible absent the information. For example, if input images share a characteristic of being produced via facial detection, an appropriate scale for measuring sharpness can be determined. Thus, in an extension of the example, an amount of an input image 204 that is expected to correspond to eyes can represent the scale by which eye sharpness is measured.

In some implementations, in addition to an input image 204, the detail detector 206 also can receive one or more locations relative to the input image 204 of depicted features. For example, the detail detector 206 can receive coordinates of eyes, a nose and a mouth depicted in the input image 204 relative to a face. The detail detector 206 can use the locations (e.g., coordinates) to improve the accuracy of detail level detection, such as by processing the received locations differently than other locations.

In a first example, the detail detector 206 can weigh a detail level of a received eye location more highly than other areas of the input image 204 in determining an overall detail level. In a second example, the detail detector 206 can employ a distinct technique for detecting detail of a received eye location than for other non-eye locations (e.g., blurring the received eye location a different amount, or using a different blurring technique). In a third example, a portion (e.g., a slice) of an input image 204 can be extracted based on a received eye or nose location. The portion can be transformed to a frequency domain representation using, e.g., a fast Fourier transform (FFT), or fast wavelet transform (FWT). Using, e.g., pattern recognition, the transformed portion can be analyzed to determine whether the portion exhibits characteristics to be expected based on the portion corresponding to, e.g., an eye or nose depiction.

The detail detector 206 can generate an output result 214 based on processing of the input image 204. The detail detector 206 can provide the output result 214 to the image correlator 202. The output result 214 can be an indication of the level of detail in the input image 204. For example, the output result 214 can be one option from an enumerated list of options (e.g., "High," "Med," or "Low"). Alternatively, the output result 214 can be a number representing the image detail level on a given scale.

The output result 214 also can include an indication of a likelihood the input image 204 depicts a particular object, such as a face. For example, the locations received by the detail detector 206 can be used in determining the likelihood the input image 204 depicts a face. The detail detector 206 can detect the detail level at locations indicated as facial features (e.g., eyes, nose, and mouth) as a basis for determining the input image 204 depicts a face.

In some implementations, the detail detector 206 can include three phases or modules, such as a preparation module 208, a processing module 210 and an analysis module 212. In some other implementations, other configurations of modules and phases can be used to the same end.

Figure 3A:
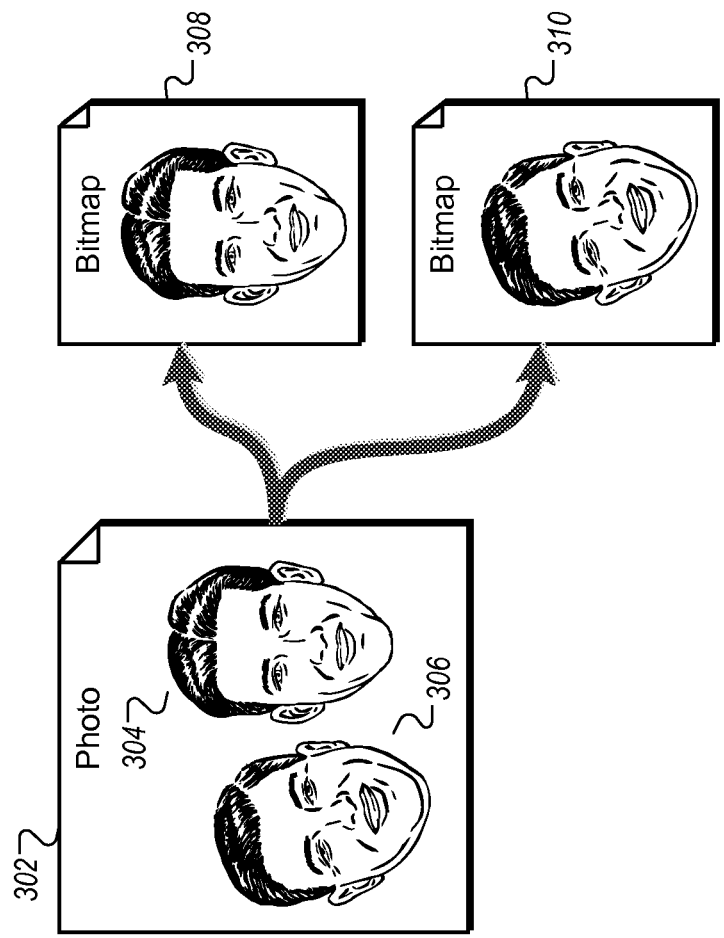
FIG. 3A is a diagram showing an exemplary extraction of portions of an image.
Figure 3B:
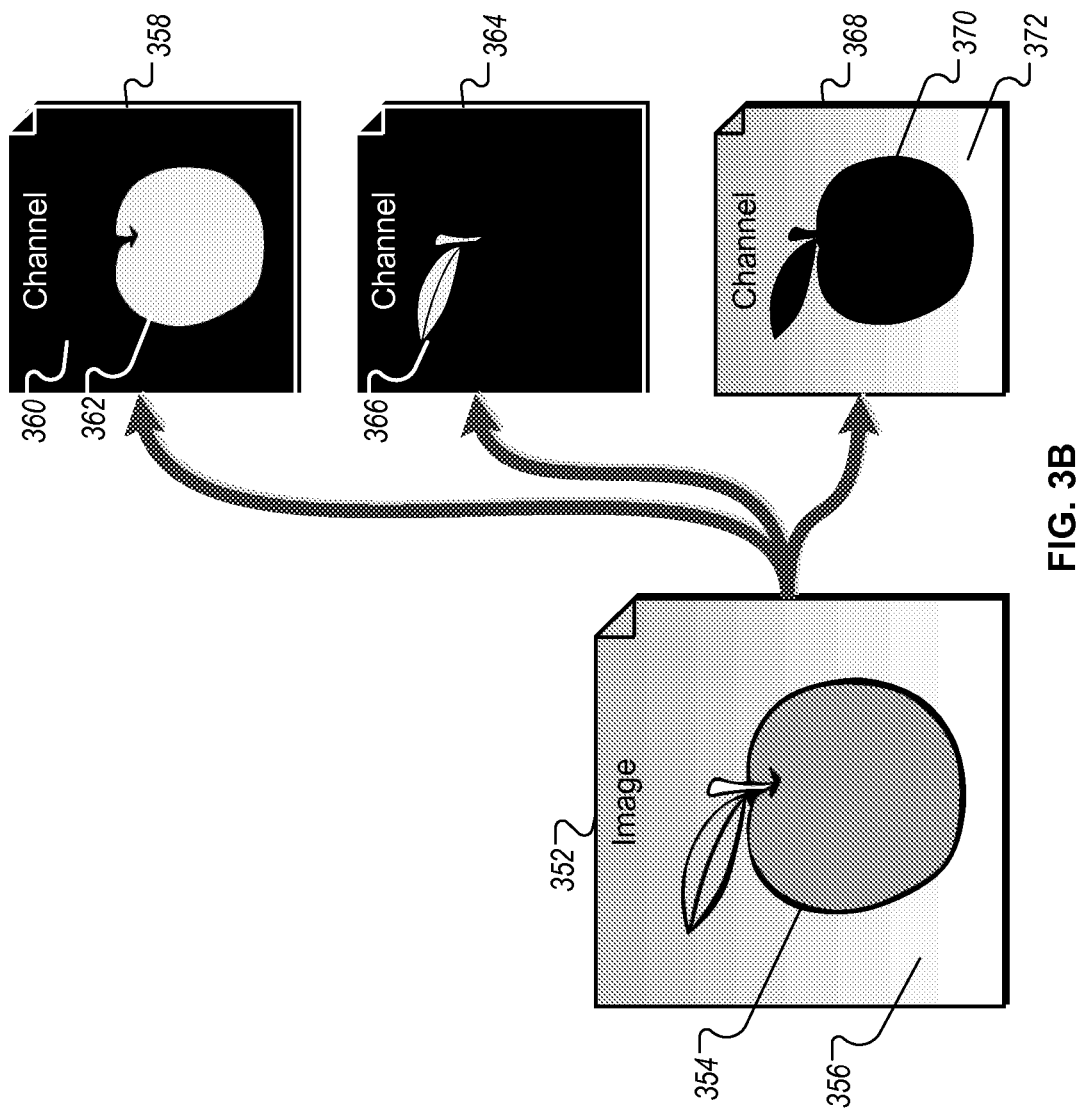
FIG. 3B is a diagram showing an exemplary extraction of channels of an image.

The preparation module 208 can prepare the input image 204 for detail detection by, e.g., extracting selected areas of the input image 204 or extracting certain image data (see FIGS. 3A and 3B). The preparation module 208 also can reduce the color depth of the input image 204. For example, the input image 204 can initially have a 16- or 24-bit color depth. The preparation module 208 can convert the input image 204 to an 8-bit color depth by decomposing the image into grayscale color channels and discarding all but one of the channels. The perceptible level of detail can be the same using an 8-bit depth as at a higher depth. The operations of the preparation module 208 can alternatively be performed in part or whole in the image correlator 202.

Figure 4:
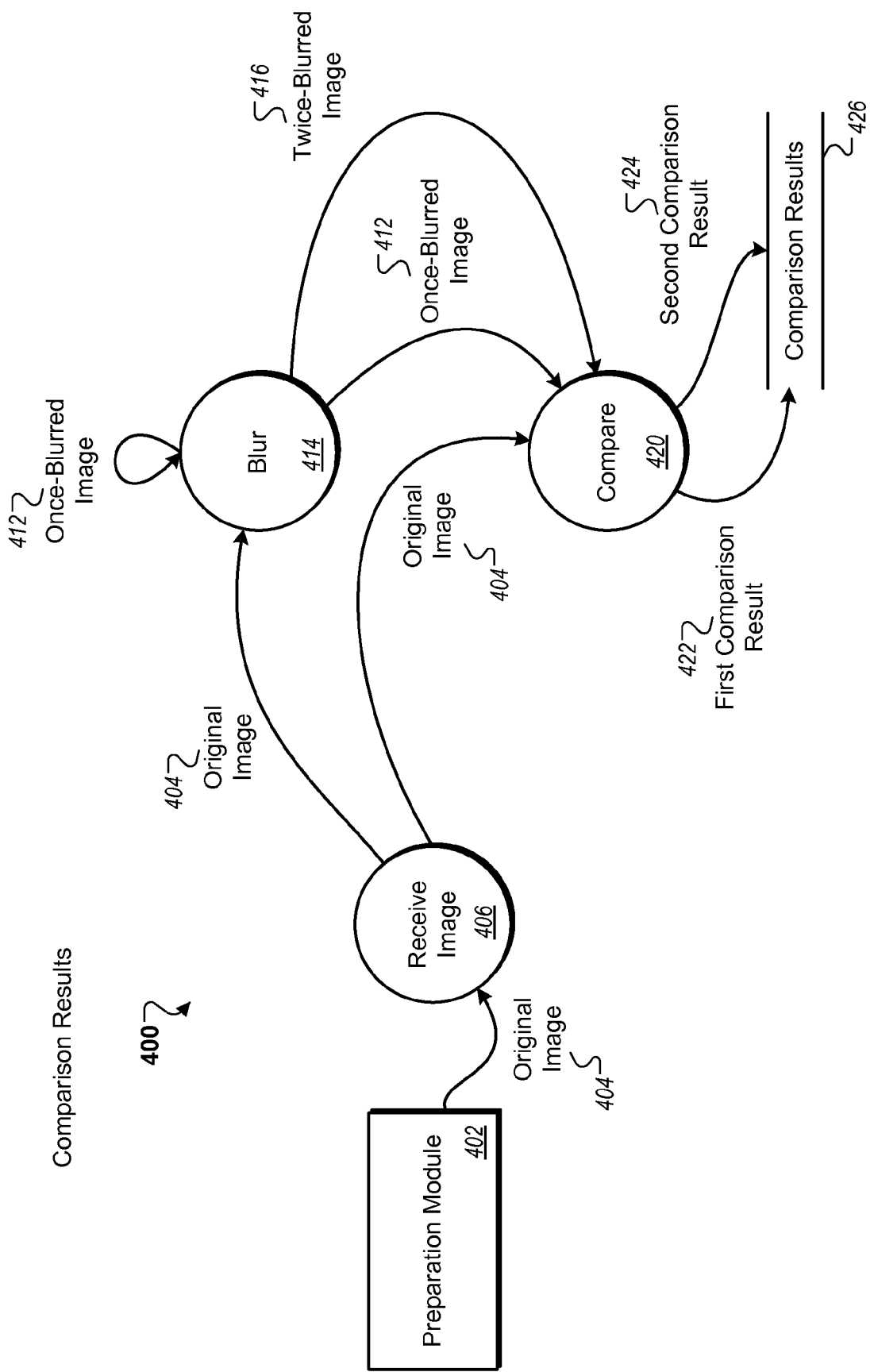
FIG. 4 is a dataflow diagram showing an exemplary detail detection dataflow.

A processing module 210 can, e.g., transform the input image 204 to produce new images and then compare the images (see FIG. 4). An analysis module 212 can, e.g., determine an overall image detail level based at least in part on the results produced by comparing the images in the processing module 210.

In general, as shown in FIGS. 3A and 3B, original images can be transformed to produce new images. For example, one or more portions of an original image can be extracted. A portion can correspond to an area of an image. A portion also can correspond to some subset of the visual information represented by an image (e.g., a channel). The new images can be prepared as part of determining an image detail level.

FIG. 3A is a diagram showing an exemplary extraction of portions of an image. A photograph 302 can be a digital image depicting multiple subjects. For example, the photograph 302 can include depictions of a first face 304 and a second face 306. Image detail level detection can be performed on a portion of a photograph substantially including only a face. Thus, one or more portions of a photograph can be extracted, such that each portion corresponds to an area of the photograph that substantially depicts only a face. The portions (e.g., the first portion 308 and the second portion 310 of the photograph 302) to be extracted can be identified by a facial detection operation or other such processing. Further, the identified portions can be extracted from the photograph 302 using standard image portioning techniques, such as cropping. The extracted portions (e.g., the first portion 308 and the second portion 310) can be provided to or as part of a detail detection operation.

FIG. 3B is a diagram showing an exemplary extraction of channels of an image. A color digital image 352 can be composed of pixels. Pixels can be represented using a combination of primary colors (e.g., red, green and blue). A channel can be a representation (e.g., a grayscale image) of one of the primary colors (e.g., green) in the color digital image 352. A channel can be stored relative to an image or extracted from the image data. Further, a channel can be the same size and resolution as the original image.

The color digital image 352 can be, e.g., a digital photograph depicting an apple 354. The apple 354 can be represented using one or more shades of red and further can include a green leaf. The background 356 of the color digital image 352 can be one or more shades of blue.

A red channel 358 corresponding to the color digital image 352 can represent the intensity of the red component. For example, a black field 360 in the red channel 358 can indicate that no red component is present in the corresponding portion of the color digital image 352. In contrast, the red portion of the apple 354 can appear as a bright area 362 in the red channel 358.

Similarly, a green channel 364 can include a bright area 366 representing the leaf portion of the apple 354. The bright area 366 indicates that the corresponding area of the color digital image 352 includes a green component.

A blue channel 368 corresponding to the color digital image 352 can include a black region 370 corresponding to the apple and leaf, indicating the lack of a blue component in the region. The background 372, however, can be bright in the blue channel 368 indicating the color digital image 352 includes a blue background.

In general, as shown in FIG. 4, part of determining a detail level of an image can be generating blurred images from the image and comparing the image and blurred images. The comparison can reveal the amount of image detail lost through successive blurs. The amount lost, and rate of loss as judged from successive blur to successive blur, can be an indication of the original detail level of the image. A more accurate detail level can be determined by generating multiple blurred images. In addition, analysis of comparison results (e.g., as described with respect to FIGS. 5A-D and 6) can further facilitate an accurate detail level determination.

FIG. 4 is a dataflow diagram showing an exemplary detail detection dataflow 400. The dataflow 400 shows the flow (e.g., movement or use) of data between terminators, processes and data stores.

A preparation module 402 can be a software module that provides input of an original image 404 to the dataflow 400. The preparation module 402 can be, e.g., the preparation module 208 or the image correlator 202 shown in FIG. 2. In some implementations, as part of the preparation module 402 portions of an image can be extracted to produce the original image 404 (e.g., substantially depicting only a single face as shown in FIG. 3A). In some implementations, as part of the preparation module 402, one or more color channels of an image can be extracted to produce the original image 404 (e.g., a green channel as shown in FIG. 3B).

The receive image process 406 can receive the original image 404 as input from the preparation module 402. The input can be a result of a programmatic call (e.g., for a method or procedure embodying, among other functionality, the receiving image process 406). The receive-image process 406 can be implemented as a part or whole of a software module (e.g., the processing module 210, in FIG. 2). The receive-image process 406 can include, e.g., initializing memory for storing the original image 404 or a reference to a memory location where the original image 404 is stored.

The blur process 414 can receive the original image 404 as input from the receive image 406 process and output a once-blurred image 412. The once-blurred image 412 can be generated by blurring the original image 404. The blur process 414 also can receive the once-blurred image 412 as input. The blur process 414 can blur the once-blurred image 412 to generate the twice-blurred image 416.

The blur process 414 can blur an image using various techniques. For example, the blur process 414 can include a two-dimensional convolution operation using, e.g., a box convolution kernel. Convolution kernels (i.e., pixel masks) can feature an odd number of rows and columns in the form of a square (e.g., 3×3 convolution kernel). The center of a kernel can correspond to the pixel being convolved and can be referred to as the target pixel. The number of positions from the center to the edge of a kernel can be referred to as the kernel radius. For example, a 3×3 kernel can be referred to as a kernel with a radius of one.

Each pixel of the original image 404 can be individually convolved. The products of the numbers in the kernel and the respective corresponding pixels can be summed, and the sum can be substituted for the value of the target pixel. The sum of products can be outside the range of values with which a pixel is represented. In such instances, the sums corresponding to each of the pixels can be normalized to the appropriate range.

The resolution of the original image 404 can be used to determine the number of blurred versions to generate and to specify the characteristics of the convolution kernels used in generating the blurred versions. Various combinations of number of blurred versions and convolution kernels can produce desirable results. For example, if an original image 404 has a high resolution (e.g., height or width of 512 pixels), either or both of larger convolution kernels (e.g., 7×7 instead of 3×3) or a higher number of blurred versions (e.g., 7 instead of 5) can be used to compensate for the higher resolution.

Compensation can account for absolute differences in size of small details in a high-resolution versus low-resolution image. For example, a high-resolution (e.g., 192×256 pixels) image can include a representation of a person's eye accounting for 1% of the image (e.g., 36×14 pixels). Similarly, a low-resolution (e.g., 48×64 pixels) image can include a representation of a person's eye accounting for 1% of the image (e.g., 9×3 pixels). Blurring both images with a 1-pixel-radius blur (e.g., a 3×3 convolution kernel) can result in the loss of far more detail in the low-resolution image than the high-resolution image based on the relative sizes of blur radius and eye representations.

One compensation approach is to blur images with increasingly larger kernels up to a given percentage (e.g., 10%, 25% or 50%) of the image size (e.g., height or width). For example, an image can have a height of 256 pixels. The image can be blurred with a convolution kernel having a radius of 1 (e.g., a 3×3 kernel), 2 (e.g., a 5×5 kernel), 4 (e.g., a 9×9 kernel) and so forth up to 64, or 25% of the height. Thus, the result can be 7 blurred versions of the image corresponding to the kernels applied (e.g., radii of 1, 2, 4, 8, 16, 32, and 64).

In addition to compensating for varying resolutions, using kernels of increasing size can improve the detail level information produced through image comparisons. For example, larger kernels (e.g., radii of 16 or 32) can result in comparisons revealing information about lower-frequency image information than smaller kernels (e.g., radii of 1 or 2).

The size and arrangement of convolution kernels used in the blur process 414 to blur images (e.g., the original image 404 and once-blurred image 412) can vary. TABLE 1 shows two exemplary approximate Gaussian-blur kernels. As discussed, successive blurs can be performed using kernels of increasing size. For example, the original image 404 can be blurred using a 3×3 kernel (e.g., as shown in TABLE 1), the once-blurred image 412 can be blurred using a 5×5 kernel (e.g., as shown in TABLE 1), and so forth. The increasingly larger kernels also can be sparsely expanded as shown in exemplary kernels in TABLE 2. Using sparse kernels of increasing size to successively blur an image can result in a final blurred image that is equivalent to an image blurred with a large continuous kernel. However, images representing stages of blurring can be produced without substantially adding computational expense.

TABLE 1

Exemplary convolution kernels

3 × 3 Kernel

| | | |
|---|---|---|
| 1 | 2 | 1 |
| 2 | 4 | 2 |
| 1 | 2 | 1 |

5 × 5 Kernel

| | | | | |
|---|---|---|---|---|
| 1 | 2 | 3 | 2 | 1 |
| 2 | 4 | 6 | 4 | 2 |
| 3 | 6 | 9 | 6 | 3 |
| 2 | 4 | 6 | 4 | 2 |
| 1 | 2 | 3 | 2 | 1 |

TABLE 2

Exemplary sparse convolution kernels

3 × 3 Kernel

| | | |
|---|---|---|
| 1 | 2 | 1 |
| 2 | 4 | 2 |
| 1 | 2 | 1 |

5 × 5 Kernel

| | | | | |
|---|---|---|---|---|
| 1 | 0 | 2 | 0 | 1 |
| 0 | 0 | 0 | 0 | 0 |
| 2 | 0 | 4 | 0 | 2 |
| 0 | 0 | 0 | 0 | 0 |
| 1 | 0 | 2 | 0 | 1 |

The compare process 420 can receive images as input and compare the differences between the images to derive a comparison result output (e.g., a first comparison result 422). The compare process 420 can be a binary process in which two input images are compared to produce a single comparison result output. For example, the compare process 420 can compare the original image 404 and once-blurred image 412 to derive the first comparison result 422. The compare process 420 also can compare the once-blurred image 412 and twice-blurred image 416 to derive the second comparison result 424.

In addition to varying the number of blurred versions of an image produced and the size of convolution kernels, resolution differences can be addressed by deriving fewer comparison results 426, or by using less than all of the derived comparison results 426. For example, the number of times an image is blurred can be constant or substantially constant regardless of resolution. Thus, a lower resolution image (e.g., 36×48) can be blurred using kernels having radii of 1, 2, 4, and so forth up to 32. A higher resolution image (e.g., 225× 300) can be blurred using kernels of the same radii. For the lower resolution image, comparison results can be generated only for the first several blurred versions, excluding the version generated with a kernel radius of 32. For the higher resolution image, comparison results can be generated only for the last several blurred versions, excluding the version generated with a kernel radius of one. Alternatively, the comparison results discussed can be derived but then not used subsequently in determining the overall image detail level. Selectively not deriving or using comparison results as part of the image detail level analysis can improve the accuracy over always deriving or using all comparison results.

The compare process 420 can compare images using one or more of a variety of metrics. For example, the compare process 420 can use a sum of absolute differences (SAD). The SAD can be generated by summing the absolute values of the differences between each pixel value in a first image (e.g., the original image 404) and each pixel value in a second image (e.g., the once-blurred image 412). In other implementations, the SAD can be replaced or used in conjunction with a sum of absolute transformed differences, sum of squared differences, rate-distortion optimization, root mean square error, peak signal-to-noise ratio, or other such metrics.

Comparison results 426 can be a store of comparison results (e.g., the first comparison result 422). The comparison results 426 can be represented as variables stored in memory during program execution or as values stored in a database or file system. The comparison results 426 can correspond to band pass information relating to the amount of information in an image corresponding to various frequency bands, such as is discussed with respect to FIGS. 5A-D.

In general, as shown in FIGS. 5A-D, graphical information in images, which is often represented in the spatial (or image) domain, also can be represented in the frequency domain. Information in an image can correspond to various frequencies. Band pass information can represent the amount of information in an image corresponding to frequency bands (or ranges). For example, the highest frequency band of an image can represent the finest details in an image (e.g., high-contrast edges such as between the sclera and the iris of an eye). The lowest frequency band can represent, e.g., the general shapes depicted in an image. The relationships between the bands can indicate the detail level of an image. However, situations can arise in which the relationships alone between the bands can indicate erroneous detail levels.

Band pass information can be estimated using various techniques such as transforming an image from the spatial domain to a frequency domain using, e.g., a fast Fourier transform (FFT), or by successively blurring an image and comparing the various images produced by each successive blur with the previous image (e.g., as in the blur process 414 and compare process 420, in FIG. 4) to determine the amount of detail lost through each blur.

Figure 5B:
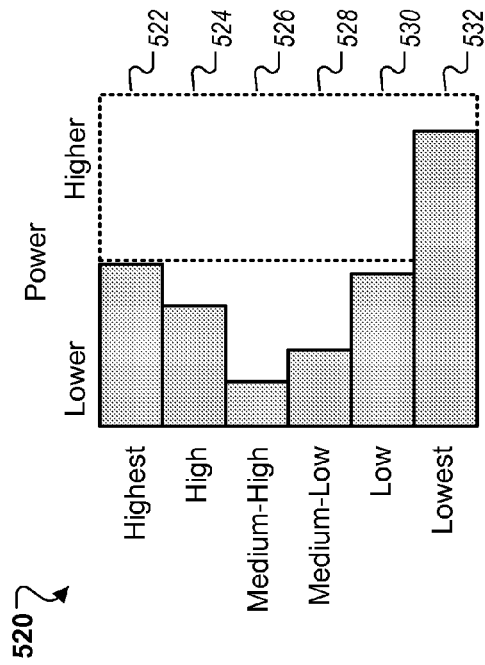
FIG. 5B is a bar chart representing band pass information corresponding to a blurry image distorted by random noise artifacts.
Figure 5D:
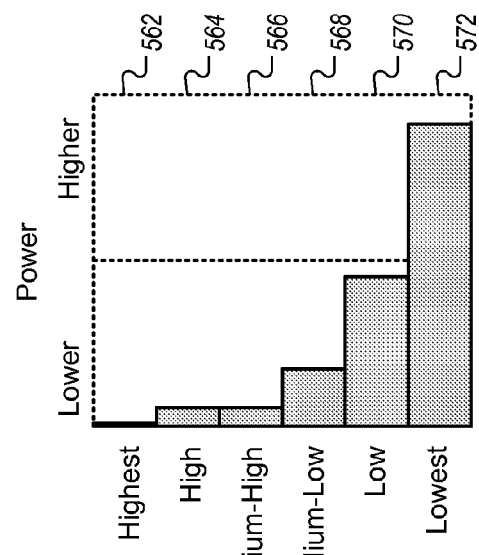
FIG. 5D is a bar chart representing band pass information corresponding to a blurry image.
Figure 5A:
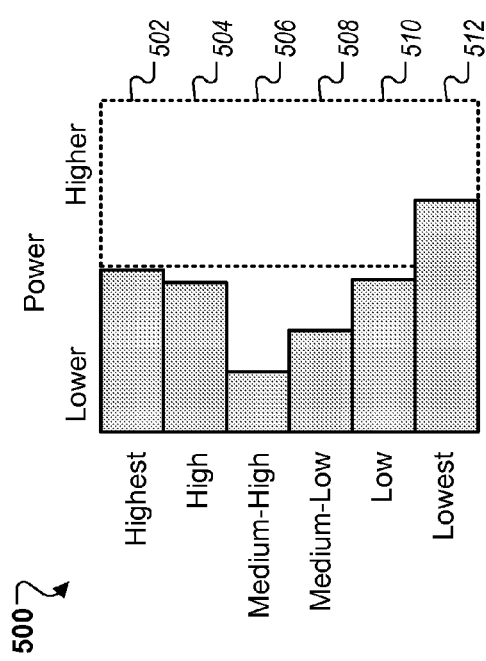
FIG. 5A is a bar chart representing band pass information corresponding to a sharp image.

FIG. 5A is a bar chart 500 representing band pass information corresponding to a sharp image. The amount of information in an image corresponding to a frequency range increases from left to right. The exemplary bars shown can represent a logarithmic scale. The vertical axis of the bar chart 500 represents frequency ranges increasing from the bottom to the top of the bar chart 500.

The highest 502 and high 504 frequency bands show that the sharp image includes corresponding image components. The components can be high contrast shifts over short spatial distances and can result from representations of, e.g., fine details and clear visual differences between objects depicted in an image, such as strands of hair or individual eyelashes. The amount of information in the frequency bands drops off in the medium-high 506 band. The medium-low 508, low 510 and lowest 512 frequency bands represent that the sharp image includes graphical information corresponding to, e.g., general shapes and varying levels of brightness.

Although the amount of information corresponding to the lower frequencies is high in the sharp image, the ratio between the low and high frequency components nevertheless reveals the image to have a relatively high level of detail. For example, the overall image detail could be determined by comparing each of the higher frequencies to find the lowest of the three (e.g., the medium-high 506 frequency), and dividing that value by the highest of the lower frequencies (e.g., the lowest 512 frequency). Using this approach, the ratio of the amounts of high frequency to low frequency information can be 0.27.

FIG. 5B is a bar chart 520 representing band pass information corresponding to a blurry image distorted by random noise artifacts. The highest 522 and high 524 frequency bands have similar levels to those of the sharp image in FIG. 5A. The noise artifacts, being small, high-contrast changes in the image domain, can mimic image details. However, because the image is actually blurry, the amount of information in the image in the higher frequency bands quickly tapers off from the highest 522 to the medium-high 526 frequency band. From this low point, the amount of information associated with the medium-low 528, low 530 and lowest 532 bands quickly increases to a very high level, relative to the sharp image in FIG. 5A. Using the same approach discussed, the ratio between the lowest amount of information of the higher frequency bands (e.g., the medium-high 526 frequency) and the highest of the lower frequency bands (e.g., the lowest 532 frequency) can be 0.16. Thus, despite some similarities with the amount of information levels of the frequency bands of the sharp image in FIG. 5A, the ratio nonetheless reveals a distinct difference between detail levels of the two images.

Figure 5C:
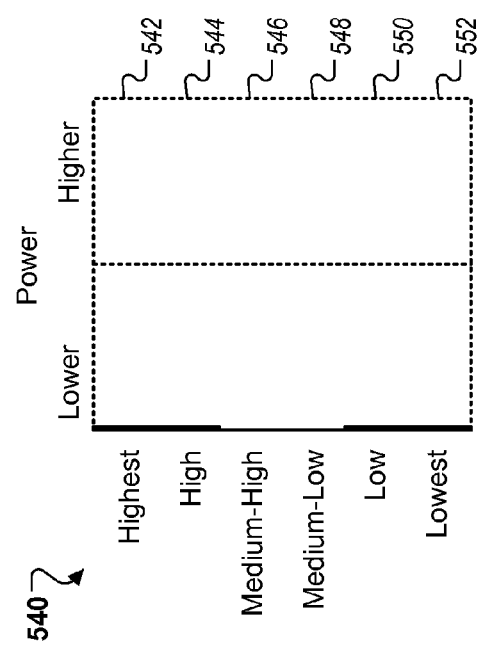
FIG. 5C is a bar chart representing band pass information corresponding to a substantially blank image.

FIG. 5C is a bar chart 540 representing band pass information corresponding to a substantially blank image. The amount of information of the highest 542, high 544 and medium-high 546 frequency bands is substantially imperceptible. Similarly, the amount of information of the medium-low 548, low 550 and lowest 552 frequency bands is substantially imperceptible. However, a ratio between the amount of information of the lowest higher frequency band (e.g., the medium-high 546 frequency) and the highest lower frequency band (e.g., the low 550 frequency) can result in an erroneous determination the image has a high detail level. For example, if the amount of information of the medium-high 546 frequency is half that of the low 550 frequency, the ratio could be 0.5—seemingly sharper than the sharp image in FIG. 5A. However, based on the very low amount of information of the lower frequencies, it can be determined that the image does not include sufficient information to convey any depictions. Thus, a threshold for a minimum amount of information for the lower frequency bands can be applied for such situations. For example, the three lower frequency band levels can be compared with a default minimum value representing a low threshold. If the default value is the higher than the other lower frequency band levels, the default value can be used in the ratio (e.g., avoiding an issue with dividing by zero).

FIG. 5D is a bar chart 560 representing band pass information corresponding to a blurry image. The amount of information of the highest 562, high 564 and medium-high 566 frequency bands is relatively very low (e.g., compared to the sharp image in FIG. 5A). In addition, the amount of information associated with the lower frequency bands increases rapidly from the medium-low 568, to low 570, to lowest 572 bands. The ratio between the lowest level of the higher frequency bands (e.g., the highest frequency 562) and the highest level of the lower frequency bands (e.g., the lowest 572 frequency) can be less than one tenth of the ratio associated with the sharp image in FIG. 5A at 0.02. The very small ratio can indicate the image is unrecognizably blurry.

Figure 6:
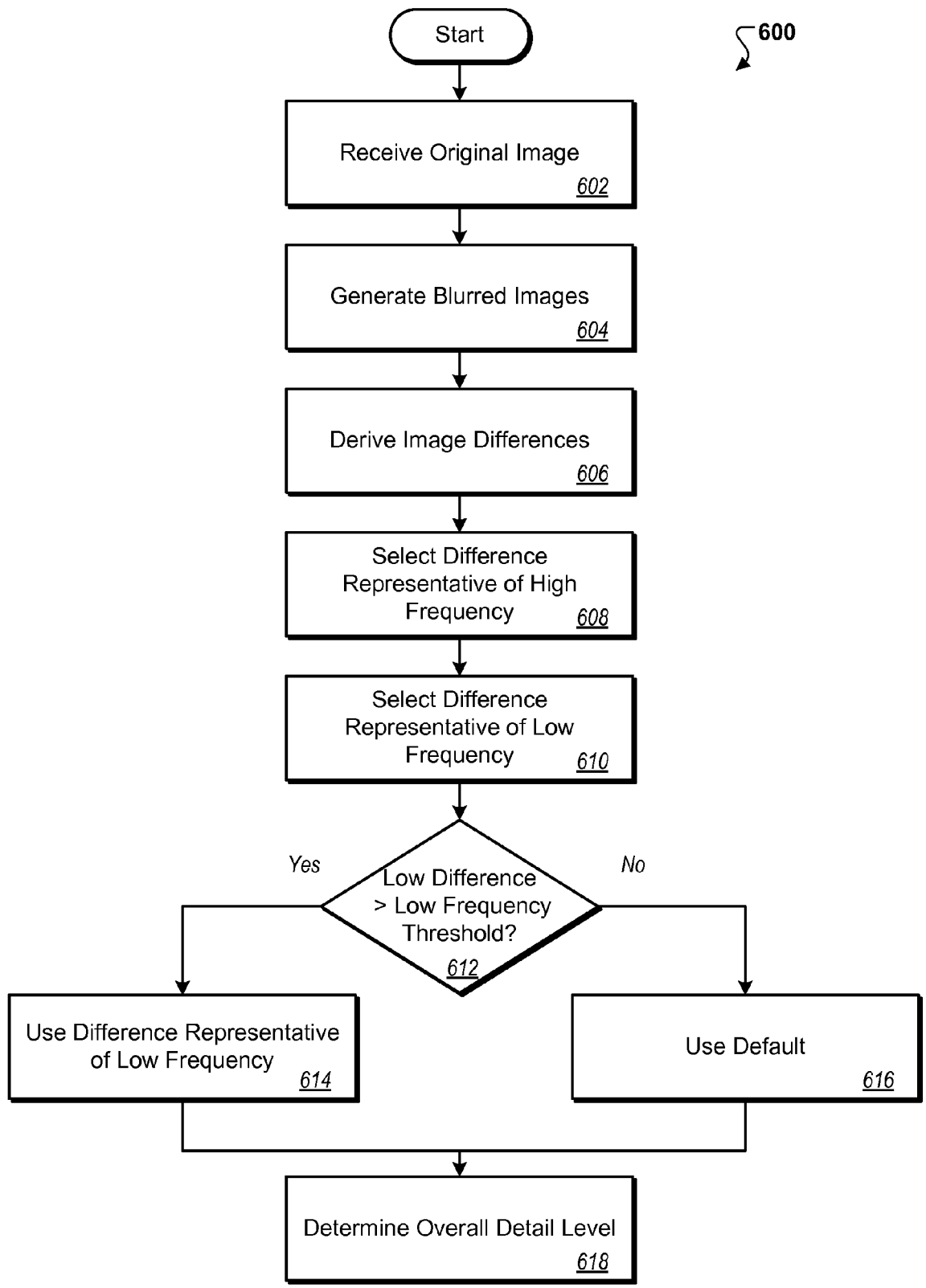
FIG. 6 is a flow chart showing an exemplary process for detecting image level detail.

In general, as shown in FIG. 6, an image detail level can be determined by successively and cumulatively transforming an image, comparing the resulting images, and using the comparison differences to determine an overall image detail level.

FIG. 6 is a flow chart showing an exemplary process 600 for detecting image level detail. The process 600 can be performed by a processor configured to execute a software application for managing images. The processor can receive an original image (602), such as from the preparation module 402, in FIG. 4, or the image correlator 202, in FIG. 2. The processor can generate blurred images (604) in order to evaluate the amount of detail lost through successive blurs. The detail lost, or differences, between cumulatively blurred images can indicate an overall level of detail for the image.

The number of blurred images generated (604) can vary depending on the resolution of the original image. For example, convolution kernels of increasing size can be used for each successive and cumulative blur. The generation of blurred images can begin with a kernel having a radius of one and increase to a radius of, e.g., 10%, 25% or 50% of the image size. Image size can be based on the spatial area of the image (e.g., using the product of image dimensions) or linear size (e.g., the height plus the width, or the larger of the height or width). The increase in size of the convolution kernel can be exponential (e.g., radii of 1, 2, 4, 8, 16, 32 and so forth) or linear (e.g., radii of 1, 3, 5, 7, 9 and so forth). The starting size also can be determined based on the image size (e.g., a starting radius of 1 for images up to 64 pixels, and a starting radius of 4 for images over 384 pixels).

Thus, the number of blurred images generated (604) can depend on the threshold of maximum kernel size relative to an image size, the starting kernel size, the manner in which image size is determined, and the nature of the increase in size of successive kernels. For example, an original image can have dimensions of 256×192. The image size can be the larger of the height or width (i.e., 256). The size of kernels used for successive blurs can exponentially increase to 25% of the image size, or in this example, to a radius of 64. The kernel size can start with a radius of 1. Therefore, seven blurred images can be generated (604) with kernels having radii of 1, 2, 4, 8, 16, 32, and 64.

After generating blurred images, the processor can derive image differences (606). Deriving image differences (606) can be a binary operation in which a first image is compared to a second image to determine the amount of change brought about by the blurring. The deriving (606) can be repeated to compare the original to the first blurred image, the first blurred image to the second blurred image and so forth up to the last blurred image. Deriving image differences can correspond to the comparing process 420 described with respect to FIG. 4.

The number of image differences derived (606) can depend on the number of images generated (604). If, for example, the deriving (606) is a binary operation, and seven blurred images are generated (604), seven image differences can be derived (606) (e.g., by comparing the original to the first blurred image, the first blurred to second blurred, the second blurred to third blurred through the sixth blurred to seventh blurred).

The processor can select one or more derived differences that are representative of high frequency (608) components of the original image. High frequency image components can, e.g., relate to fine details and edges depicted in images. The processor can combine the one or more derived differences into a value representative of the high frequency components of the original image. The processor can select the one or more derived differences from a group of higher frequency differences (e.g., highest 502, high 504 and medium-high 506 frequencies in FIG. 5A). In some implementations, the group of higher frequency differences can be the differences derived from images generated with the smallest radius blurs relative to the set of images generated, such as the smallest 25%, 50% or 75% radii. In other implementations, the group of higher frequency differences can include some but exclude others of the differences derived from images generated with the smallest radius blurs. For example, the group of higher frequency differences can include differences derived from images generated with the smallest 50% of radius blurs but exclude outliers relative to a nonlinear comparison of the differences.

The processor can select (608) the one or more derived differences using various techniques. In some implementations, the processor can select a difference having the lowest value from the group of higher frequency differences. Selecting the difference having the lowest value can avoid errors caused, e.g., by one frequency band representing a disproportionately and deceptively high amount of information (e.g., as can be caused by image noise). In other implementations, the processor can adaptively select the one or more differences based on a linear or nonlinear comparison between the group of higher frequency differences. In still other implementations, the processor can select the one or more differences based on finding a curve to best fit the frequency levels. Characteristics of the curve (e.g., slope) can indicate differences to select or differences to not select.

The processor can select one or more derived differences that are representative of low frequency (610) components of the original image. Lower frequency image components can, e.g., relate to the general shapes depicted in an image. The processor can combine the one or more derived differences into a value representative of the low frequency components of the original image. The processor can select the one or more derived differences from a group of lower frequency differences (e.g., medium-low 508, low 510 and lowest 512 frequencies in FIG. 5A). In some implementations, the group of lower frequency differences can be the differences derived from images generated with the largest radius blurs relative to the set of images generated, such as the largest 25%, 50% or 75% radii. In other implementations, the group of lower frequency differences can include some but exclude others of the differences derived from images generated with the largest radius blurs. For example, the group of lower frequency differences can include differences derived from images generated with the largest 50% of radius blurs but exclude outliers relative to a nonlinear comparison of the differences.

The processor can select (610) the one or more derived differences using various techniques. In some implementations, the processor can select a difference having the highest value from the group of lower frequency differences. Selecting the highest difference can avoid errors caused, e.g., by one of the lower frequency bands representing a deceptively low amount of information, distorting the ratio of low to high frequency image components. In other implementations, the processor can adaptively select the one or more differences based on a linear or nonlinear comparison between the group of lower frequency differences.

The processor can determine (612) whether the difference representative of the low frequency components is greater than a certain low frequency threshold. The low frequency threshold can be a constant value that represents a low, non-zero level of lower frequency detail. For example, if the amount of information associated with each of the lower frequency bands is very low, the image can lack sufficient information to effectively represent anything (e.g., being substantially blank). In such a situation, the ratio between the low and high frequency image components can be irrelevant. Using a default, low but non-zero, low frequency difference (616) can prevent division by zero in a ratio in which the low frequency difference is the denominator. Use of a default low frequency difference (616) also can allow a ratio between high and low frequency differences to go to zero or substantially zero when the high frequency differences are zero or substantially zero.

If the processor determines (612) that the difference representative of the low frequency components is greater than the low frequency threshold, the processor can use the difference representative of the low frequency components (614) rather than a default low frequency.

With the difference representative of the low frequency components and the difference representative of the high frequency components, a ratio can be calculated as part of determining an overall image detail level (618).

FORMULA 1. can be an exemplary formula for determining an overall detail level (L). A min function can select a lowest of a series of values. A max function can similarly select a highest of a series of values. $D_1$ can be a difference between an original image and a first blurred image. $D_1$ can represent the highest frequency image components. $D_2$ can be a difference between a first blurred image and a second blurred image. $D_3$, $D_4$, $D_5$, and $D_6$ can represent differences corresponding to image components of decreasing frequency. Finally, C can be a constant value (e.g., 3.0) that represents an objectively low, but non-zero, difference. Thus, the max function selecting C can indicate $D_4$, $D_5$, and $D_6$ are all lower than C and that the corresponding image is substantially blank.

$$L = \frac{\min(D_1, D_2, D_3)}{\max(D_4, D_5, D_6, C)}.$$ FORMULA 1

Figure 7:
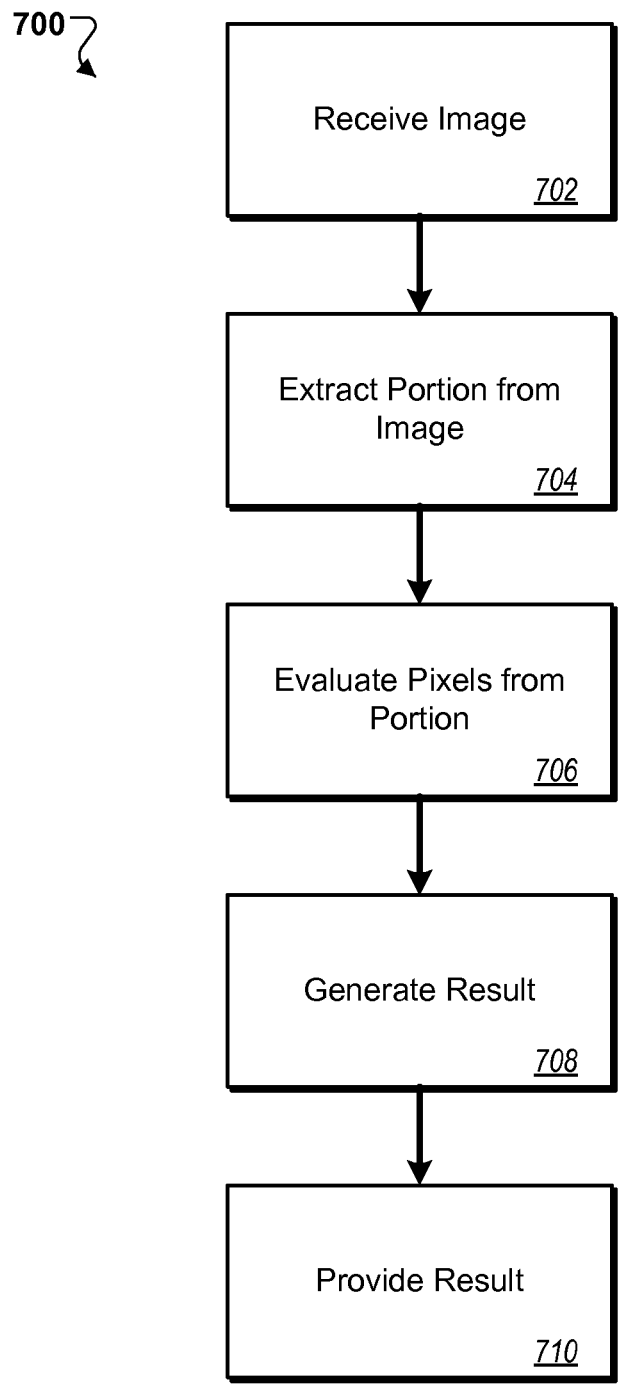
FIG. 7 is a flowchart showing an exemplary overall process for detecting skin tone.

In general, as shown in FIG. 7, skin tone in an image (or image portion) can be detected to determine whether the image likely represents skin. Detecting skin tone can include sampling the image and evaluating the pixels in the sampled portion individually to determine overall whether the pixels represent skin tone. The result of the detection can be provided to a requesting component, application or system, such as in the form of a value.

FIG. 7 is a flowchart showing an exemplary process 700 for detecting skin tone. A skin tone detection processor can be configured to detect skin tone in an image, such as an image in which one or more faces have been detected. The images can include face-like patterns which correspond to faces of people or other objects (e.g., rocks or tree bark). Further, the skin tone detection processor can be configured to detect skin tone in a variety of lighting and filter (e.g., sepia) conditions. Additionally, the skin tone detection processor can be configured to detect skin tone representing various types of pigmentation. The skin tone detection processor can receive an image (702). For example, an application (or component thereof) associated with the skin tone detection processor can call the skin tone detection processor and transfer the image to the skin tone detection processor. The skin tone detection processor can receive the image (702) as part of the call and the transfer can be by reference (e.g., passing a pointer to a memory location of the image) or by value (e.g., passing the image as data stored in memory).

The skin tone detection processor can extract a portion from the received image (704). The extraction can be performed as described with reference to FIG. 8. Extracting the portion can include selecting a portion, copying a portion, or referring to a portion of the image. The portion can be, e.g., a specific region of the image. Alternatively, the portion can include individual pixels distributed throughout the image or pixels located within one or more specific portions of the image. In a first example, the portion can be rectangular and based on either or both of a size of the image (e.g., ⅓ the width and ⅓ the height of the image) and an angle of a face depicted in the image (e.g., relative to the image coordinates). The portion can be substantially centered relative to the image, centered but offset to below center, or situated in another location. In a second example, the portion can be every n$^{th}$ pixel in a region, such as the rectangular region described in the first example. In a third example, the portion can be selected based on the color, brightness, or other characteristic of the pixels (e.g., all pixels within a brightness range). Any methodology can be used to select the portion.

The skin tone detection processor can evaluate pixels from the extracted portion (706) to determine whether the pixels correspond to skin tone colors. The evaluation can be performed as described relative to FIGS. 9 and 10. Evaluating pixels can include iterating through some or all of the pixels in the portion and individually considering the pixels. A pixel can be converted to one or more color spaces and analyzed to determine whether the pixel corresponds to a skin tone. The skin tone detection processor can maintain information about the overall portion based on the evaluation of the individual pixels. For example, the skin tone detection processor can count the number of pixels in the portion and the number of pixels corresponding to a skin tone. Based on the information, the skin tone detection processor can determine whether the pixels overall correspond to skin tone colors. For example, the skin tone detection processor can compare the number of skin tone pixels to the total number of pixels to make the determination.

Based on the determination, the skin tone processor can generate a result (708) that provides a confidence level regarding whether the image received (702) depicts skin. The result can consequently indicate whether the image is more or less likely to depict a face. The skin tone detection processor can provide the result (710) to an image management application or a component thereof. Providing the result (710) can include transferring a numerical value representing the determination result or other indication regarding the determination result (e.g., an "accept" or "reject" indication).

Figure 8:
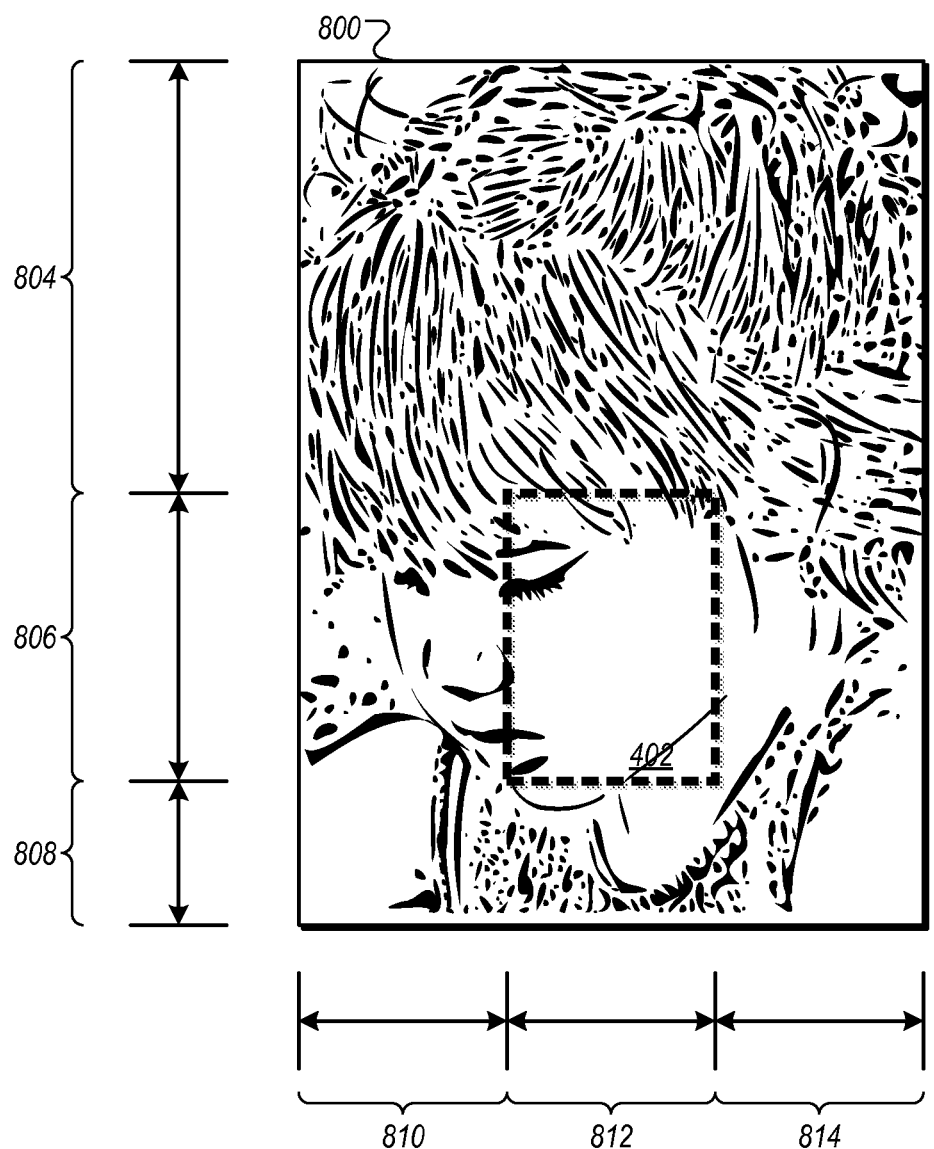
FIG. 8 is a diagram showing an exemplary extraction of a sample portion of an image.

In general, as shown in FIG. 8, a sampled portion from an image, e.g. a face rectangle, can be used in detecting skin tone. Images of faces can include skin tone elements (e.g., skin of a face) and non-skin tone elements (e.g., hair, hats, sunglasses, clothing, foliage, etc.). Using a portion of an image for skin tone detection can improve the detection accuracy by maximizing skin tone elements while minimizing non-skin tone elements.

FIG. 8 is a diagram showing an exemplary extraction of a sample portion 802 from an image 800. An image 800 can depict a face (e.g., a face of a young girl). Although the image 800 depicts a face, the image 800 can include elements not corresponding to skin tone, such as background and clothing. The accuracy of a skin tone detection process that evaluates whether pixels correspond to skin tone colors can be improved by selecting a sample portion 802 from the image 800 that will be more likely to include pixels corresponding to a facial region. For example, based on a facial detection process, images substantially representing only a face can be produced. In one example, the images can be rectangular. The rectangular images, despite wide variations in lighting, face angle, size, and non-facial image data, can consistently include pixels representing skin tone colors in one or more particular regions that can be sampled.

The sample portion 802 can be rectangular in shape. In other implementations, the sample portion 802 can be another shape (e.g., a triangle or circle). The sample portion 802 can have the same aspect ratio as the image 800. The sample portion 802 alternatively can have a fixed aspect ratio (e.g., 3:4) irrespective of the aspect ratio of the image 800. The sample portion 802 can be sized proportionately to the image 800. For example, the width 812 of the sample portion 802 can be a quarter or third of the width of the image 800.

Similarly, the height 806 of the sample portion 802 can be a quarter or third of the height of the image 800. The proportion of the width 812 of the sample portion 802 relative to the image 800 can be the same or different than the proportion of the height 806 of the sample portion 802 relative to the image 800. Alternatively, the size and shape of the sample portion 802 can depend on the depictions of the image 800. For example, the shape of the sample portion 802 can correspond to a two-dimensional projection of a rectangle rotated in three-dimensional space according to the angle of a face depicted in the image 800.

The sample portion 802 can be positioned horizontally approximately in the center of the image 800. Thus, the distance 810 from the left edge of the image 800 to the left edge of the sample portion 802 can be approximately equal to the width 812 of the sample portion and the distance 814 from the right edge of the sample portion 802 to the right edge of the image 800.

Furthermore, the sample portion 802 can be positioned vertically approximately in the center of the image 800. Thus, the distance 804 from the top edge of the image 800 to the top edge of the sample portion 802 can be approximately equal to the height 806 of the sample portion 802 and the distance 808 from the bottom edge of the sample portion 802 to the bottom edge of the image 800 (not shown). Alternatively, the sample portion 802 can be offset to below center such that the distance 804 from the top of sample portion 802 to the top of the image 800 is greater than the distance 808 from the bottom of the sample portion 802 to the bottom of the image 800.

Figure 9:
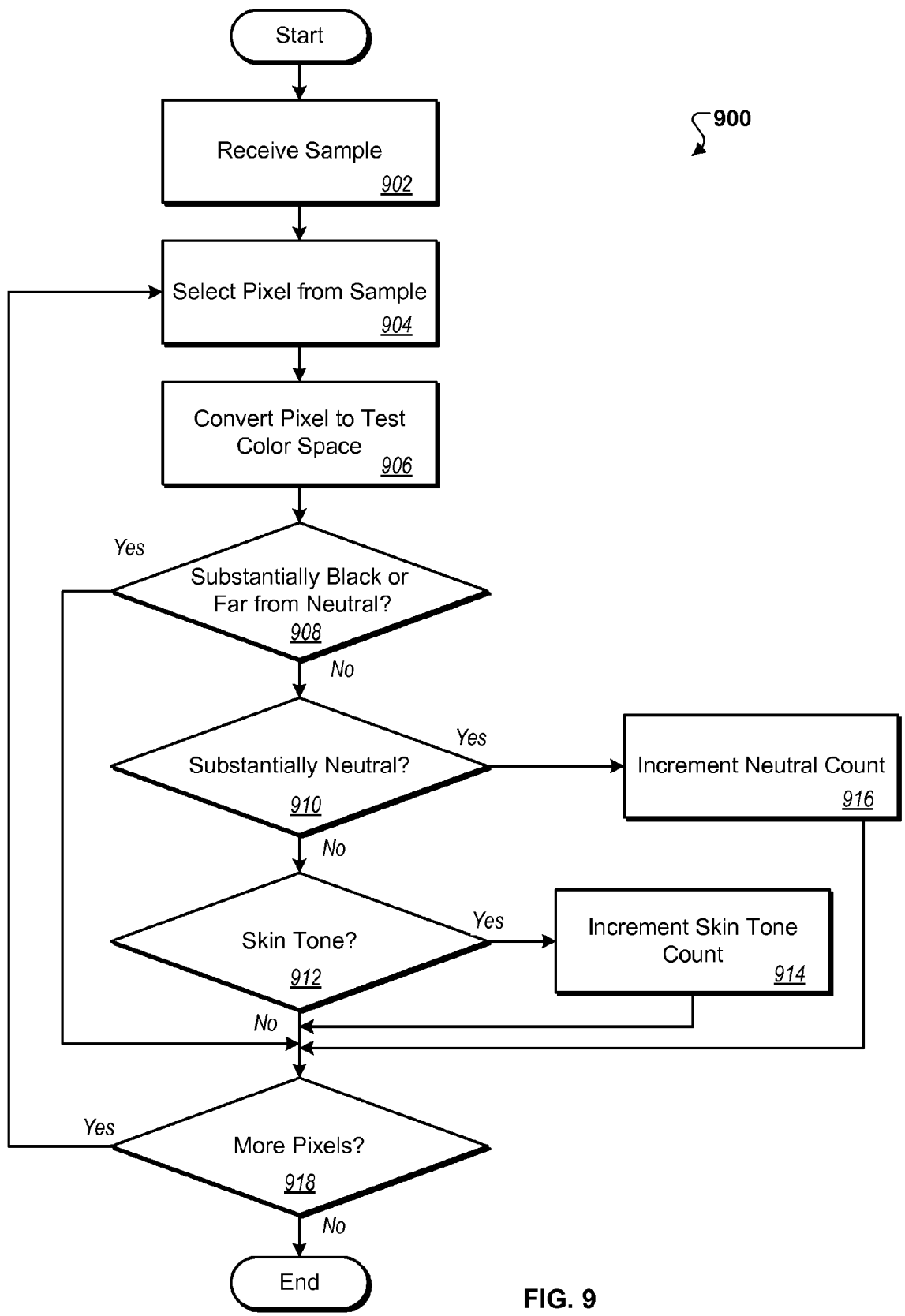
FIG. 9 is a flowchart showing an exemplary process for detecting skin tone in a sample portion of an image.

In general, as shown in FIG. 9, pixels from a sample portion of an image can be evaluated as part of detecting whether the sample portion represents skin tone. The process 900 can include individually considering pixels, converting pixels from an original color space to one or more test color spaces, checking for various conditions, and maintaining a count of skin tone pixels.

FIG. 9 is a flowchart showing an exemplary process 900 for detecting skin tone in a sample portion of an image. A skin tone detection processor can be configured to detect skin tone in samples from images, such as images in which faces have been detected. The samples can be portions of images likely to include skin tone pixels. Further, the skin tone detection processor can be configured to detect skin tone in a variety of lighting conditions and for various types of pigmentation. The skin tone detection processor can receive a sample portion (902). For example, an application (or component thereof) associated with the skin tone detection processor can call the skin tone detection processor and transfer the sample portion to the skin tone detection processor. The skin tone detection processor can receive the sample portion (902) as part of the call and the transfer can be by reference or by value. The skin tone detection process 900 also can be part of a larger process having access to the image and the sample portion (e.g., the process 700 shown in FIG. 7) thus obviating the need to transfer the sample portion.

The skin tone detection processor can select a pixel from the sample portion (904). Selecting a pixel can involve individually considering pixels in the sample portion through an iterative process. For example, the pixels in a sample portion can be loaded into a buffer represented as an array. Using a loop, the skin tone detection processor can execute a pass of the loop for pixels in the sample portion. The skin tone detection processor can select (904) each pixel in the sample portion or a subset of the pixels in the sample portion (e.g., every other or every third pixel).

Pixels in the sample portion can be represented with varying numbers of bits. For example, pixel colors can be four-dimensional and thus have four components, such as red, green, blue and transparency. The components can be represented by, e.g., 4, 8, or 16 bits. Thus, each pixel can be represented by, e.g., 16, 32 or 64 bits in total. Similarly, pixel colors can be three dimensional and have three components (e.g., red, green and blue (RGB) or hue, saturation and lightness (HSL)).

The skin tone detection processor can evaluate whether a pixel color is skin tone in various test color spaces. The pixel color selected from the sample portion can be associated with an original color space and then converted (906) to one or more test color spaces. Converting from an original color space to a test color space can simplify the evaluation of whether a pixel is skin tone. Converting also can improve the accuracy of the evaluation. Converting a pixel color to multiple test color spaces also can allow comparison between and combination of test results using the multiple test color spaces. For example, a pixel color can be converted to a first test color space adapted to improve the accuracy of positive skin tone detection but in which false positive skin tone detection also can occur. Testing the pixel color in a second test color space can corroborate the test result in the first test color space, or indicate a likelihood of results in the first test color space representing falsely positive skin tone detection.

Furthermore, the skin tone detection processor can convert the selected pixel (906) from a three-dimensional (e.g., RGB) or four-dimensional (e.g., RGB with transparency, or cyan, magenta, yellow, and key (CMYK)) original color space to a one-, two-, or three-dimensional test color space. For example, a two-dimensional test color space, such as red-green (R-G) or red-blue (R-B), can provide accurate and efficient skin tone detection.

Pixels can be converted from an original color space to a test color space using a variety of techniques. For example, to convert from a four-dimensional color space to a three-dimensional color space, one pixel component, such as transparency, can be ignored. Alternatively, a transparency component can be equated with white and mixed with the other color components to convert from a four-dimensional color space to a three-dimensional color space.

To convert from a three-dimensional color space to a two-dimensional color space, a variety of techniques also can be used. In some implementations, one of the three components can be ignored. In other implementations, a pixel in a three-dimensional color space (e.g., RGB) can be converted to a different three-dimensional color space (e.g., HSL space) and one of the three components (e.g., lightness) can then be ignored. In still other implementations, the skin tone detection processor can divide one color component of a pixel by the pixel's luminosity.

Luminosity can be calculated in various ways. Where R represents a red component of a pixel color, G represents a green component, and B represents a blue component, the luminosity (L) can be calculated using the formula:

$$L=(0.299 \times R)+(0.587 \times G)+(0.144 \times B).$$

Alternatively, luminosity can be calculated using the formula:

$$L=R+G+B.$$

In other implementations, assuming a max operation selects the largest value from a list of values and a min operation selects the smallest value from a list of values, luminosity can be calculated using the formula:

$$L = \frac{1}{2} \times (\max(R, G, B) + \min(R, G, B)).$$

In two-dimensional color space, each pixel can have two components. For example, pixels in R-G color space (or R-G space) can have a red and a green component, or in R-B color space, a red and a blue component. If a pixel is converted (906) to an R-G color space, the pixel's red component ($R_{new}$) can be calculated using the formula:

$$R_{new} = \frac{R}{L}.$$

The pixel's green component ($G_{new}$) can be calculated using the formula:

$$G_{new} = \frac{G}{L}.$$

Depending on the luminosity formula used, the new red and green components can be normalized such that the range of possible values for each component is 0.0-1.0. The red and green components also can be normalized after conversion.

In some implementations, the skin tone detection processor can determine whether a selected pixel is substantially black or far from neutral (908) or whether a selected pixel is substantially neutral (910) before converting the selected pixel to a test color space (906). In other implementations the skin tone detection processor can make these determinations after converting a selected pixel to a test color space (906).

In either case, the skin tone detection processor can determine whether a color of a selected pixel is substantially black or far from neutral (908). The determination can eliminate a pixel from further consideration that is very unlikely to correspond to skin tone or for which skin tone detection is unreliable. For example, a pixel that is substantially black can lead to unreliable skin tone detection. Because the pixel appears substantially black, the components of the pixel color (e.g., hue) can be substantially irrelevant visually and thus less carefully defined when an image is produced than for a pixel whose components are visually noticeable.

Furthermore, a pixel color which is far from neutral can be highly saturated and very unlikely to correspond to skin tone. A neutral color can be a color for which the color components are equal (e.g., R=G=B) and can appear to be black, gray, or white. A highly saturated color can be visually far from neutral colors. Saturation can be calculated or assessed using a variety of techniques. In a first example, highly saturated colors can correspond to a region of a two-dimensional color space such as represented in a coordinate system (e.g., such as the diagram shown in FIG. 10 of a color space coordinate system). A store of coordinates defining a polygonal region in the coordinate system can define highly saturated colors. The skin tone detection processor can determine whether a pixel color is far from neutral by assessing whether the color of the pixel is within the polygonal region. In a second example, saturation can be calculated using, e.g., two or three color components of a pixel. The components used can depend on whether the pixel is represented in two- or three-dimensional color space. In a three-dimensional color space, saturation (S) can be calculated using the formula:

$$S = \frac{\max(R, G, B) - \min(R, G, B)}{\max(R, G, B)}.$$

In a two-dimensional color space, saturation can be calculated using the formula:

$$S = \frac{\max(R, G) - \min(R, G)}{\max(R, G)}.$$

In a normalized two-dimensional color space in which luminosity has been removed (e.g., R-G space), saturation can be calculated using the formula:

$$S = \sqrt{\left(R - \frac{1}{3}\right)^2 + \left(G - \frac{1}{3}\right)^2}.$$

Such saturation formulas can provide a value representing the saturation from a minimum value to a maximum value (e.g., 0-255, or 0.0-1.0). If higher values (e.g., 255) represent high saturation, the skin tone detection processor can determine that pixels above a certain threshold (e.g., 240) are far from neutral (i.e., highly saturated).

If the skin tone detection processor determines (908) that a pixel color is substantially black or far from neutral, the skin tone detection processor can ignore the pixel and determine (918) whether more pixels need to be selected.

If, on the other hand, the skin tone detection processor determines that the pixel color is not substantially black and not far from neutral, the skin tone detection processor can determine (910) whether the pixel color is substantially neutral. As mentioned, a neutral color can be a color for which the color components are equal (e.g., R=G=B) and can appear to be black, gray, or white. A pixel color that is substantially neutral can result from an input image, and therefore a sample portion of the input image, having a grayscale color signature. In such an image, and portions thereof, substantially all pixels can have a similar characteristic of being substantially neutral. Grayscale images lack color information and therefore can be unsusceptible to skin tone detection. In addition, neutral colors can be uncharacteristic of human skin and therefore not recognized as skin tone. In addition to grayscale, the skin tone detection processor in some implementations can be configured to detect other artificial color signatures (e.g., sepia). Because other artificial color signatures may prevent accurate skin tone detection, detection of such signatures can allow a processor to provide output indicating, e.g., that no information can be provided about the image through skin tone detection or that the image passes (i.e., is accepted by) a skin tone evaluation.

The skin tone detection processor can determine that a color of a pixel is neutral (910), and increment a neutral count (916). The neutral count can be a number representing the pixels in a sample portion which are substantially neutral. The neutral count can be used when all the pixels in a sample portion have been evaluated to determine, e.g., that the sample portion is grayscale. For example, the neutral count can be divided by the total pixels in an image to generate a percentage. High percentages (e.g., 95-100%) can indicate that the sample portion is likely grayscale. The accuracy of the determination that the sample portion is grayscale can be improved by evaluating the sampled image (i.e., the image from which the sample portion was taken) or other sample portions taken from the same sampled image. After the neutral count is incremented, the skin tone detection processor can determine whether more pixels remain to be evaluated (918) as will be discussed below.

Figure 10:
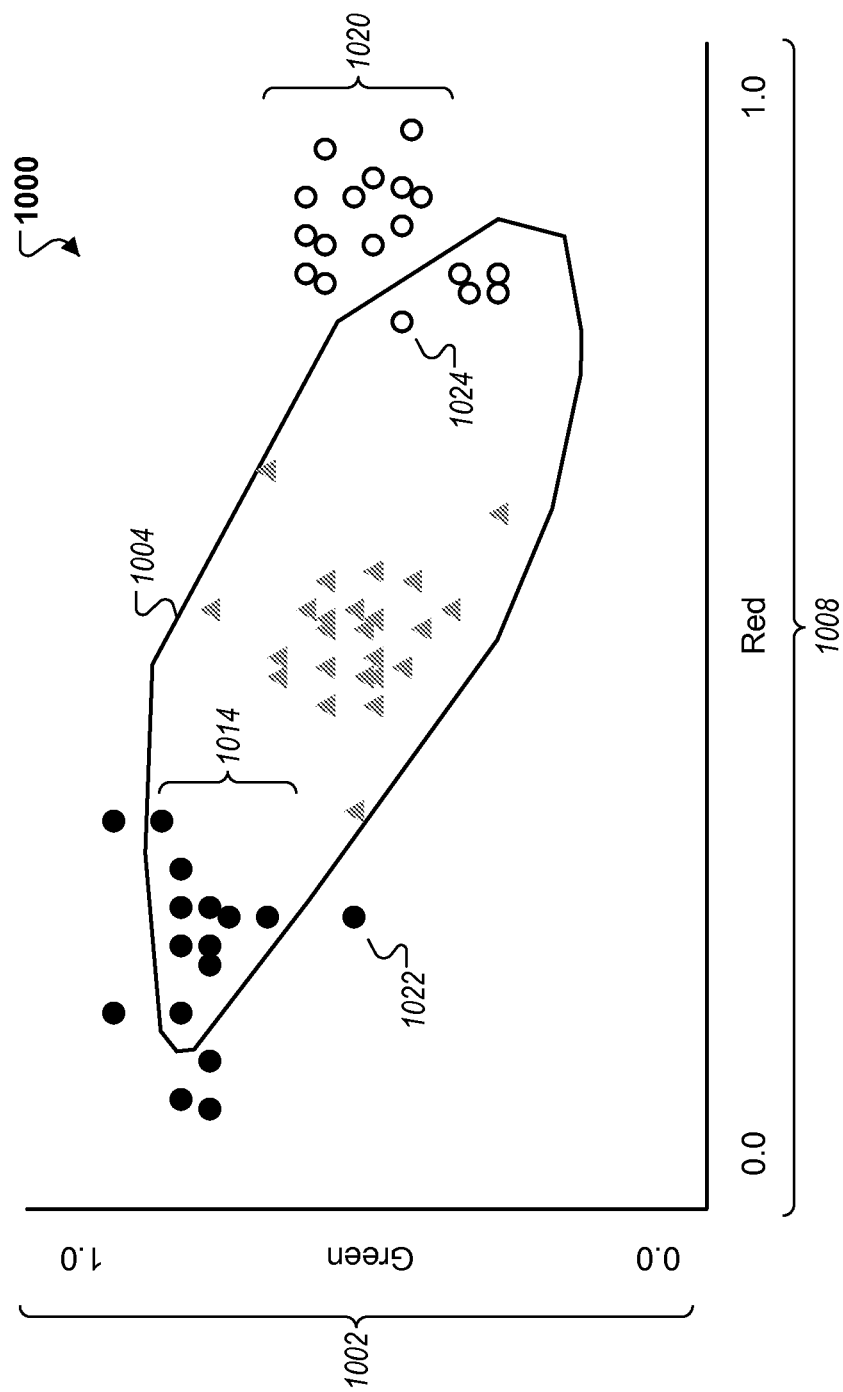
FIG. 10 is a diagram showing an exemplary skin tone region of a color space.

If the skin tone detection processor determines (910) that a pixel color is not near neutral, the skin tone detection processor can evaluate whether the pixel corresponds to skin tone (912). The determination can involve delineating in a color space a polygonal region associated with skin tone. The polygonal region can be defined empirically, analytically or in another manner (e.g., based on objectives of the skin tone detection). For example, the polygonal region can include the overwhelming majority of face-sampled colors based on empirical studies of images including faces. The polygonal region can be delineated in R-G space as shown in FIG. 10. The skin tone detection processor can determine a pixel color is skin tone by assessing whether the pixel color is located inside the polygonal color space region.

The skin tone detection processor can increment a skin tone count (914) if the pixel color is inside the polygonal region. If the pixel color is outside the polygonal region, the skin tone detection processor can skip incrementing the skin tone count. In this manner, when all the pixels have been evaluated, a percentage of skin tone pixels to total pixels can be produced. It can be determined, based on the percentage being higher than a given threshold (e.g., 50%, 75% or 90%) that the sample portion overall, and the image, depict skin.

Alternatively, in some implementations, a skin tone detection processor can determine whether a pixel is skin tone by determining a distance of the pixel color from a skin tone line or skin tone polygonal region in a color space. Rather than incrementing a skin tone count, the distance of each pixel from the line or polygonal region can be summed or averaged to produce an overall distance from skin tone. The overall distance can be used to determine whether a sample portion overall represents skin tone.

In some implementations, the accuracy of evaluating whether a pixel corresponds to skin tone can be improved by using metadata relating to the image. For example, Global Positioning System (GPS) information or information conforming to the Exchangeable image file format (Exif) specification associated with the image can be used to determine the time of day and location where an image was captured. The metadata can be used to subjectively adjust the delineated skin tone region of the color space to accommodate the circumstances associated with an image (e.g., adjusting the region to account for dark tones in images captured with a camera at night).

After incrementing the skin tone count, the skin tone detection processor can determine (918) whether pixels remain to be evaluated. For example, the skin tone detection processor can determine a progress through the pixels in a memory representation (e.g., an array) of the sample portion. If all the pixels to be evaluated in a sample portion have been evaluated, the skin tone processor can end the process 900 of evaluating sample portion pixels. If the skin tone detection processor, on the other hand, determines (918) that pixels remain to be evaluated, the skin tone detection processor can select the next pixel to be evaluated from the sample portion (904).

In general, as shown in FIG. 10, a polygonal region in a color space can be delineated to define skin tone. A skin tone detection processor can evaluate whether the colors of pixels from an image (e.g., pixels in a sample portion of an image) represent skin tone by ascertaining whether the pixel colors are inside or outside the polygonal region.

FIG. 10 shows a diagram 1000 depicting an exemplary skin tone region 1004 of a color space. The diagram 1000 can include a two-dimensional, normalized R-G color space coordinate system representation. A point on the coordinate system can represent a color in the color space. A red and a green component of the color can be represented by the location of the point. In specific, a horizontal axis 1008 can correspond to a red component of a color. The distance of a point, from left to right, can indicate the intensity of the color's red component. A point near the vertical axis can have a red component of lower intensity than a point further from the vertical axis. The vertical axis 1002 can correspond to a green component of a color. The distance of a point, from bottom to top, relative to the vertical axis 1002 can indicate the intensity of a color's green component. The potential values of the red and green components can be normalized such that the lowest possible intensity can be indicated by 0.0 and the highest possible intensity can be indicated by 1.0. For example, a pixel can have a green component of 1.0 and a red component of 1.0 in the R-G space. A point representing the color of the pixel can be located in the upper-right corner of the diagram 1000.

The skin tone region 1004 can be delineated using a polygonal region in R-G space. The size and shape of the skin tone region 1004 can be established empirically. For example, images including actual skin depictions can be analyzed. The colors of pixels corresponding to skin tone can be stored. The stored results can be used to generate the skin tone region 1004.

The skin tone region 1004 can include the majority of face-sampled colors. The faces can correspond to individuals representing substantially all global skin tones. In some implementations, the skin tone region 1004 can be established more narrowly such as to identify colors characteristic of one or more races. In other implementations, the size or shape of the skin tone region 1004 can change based on further evaluations of images or based on user input. For example, in an image management application a user can identify faces of individuals not identified by the image management application. Based on the input and pixel colors of the identified faces, the skin tone region 1004 can be adapted to more accurately detect the skin tone of faces identified by the user.

In some implementations, multiple skin tone regions, such as the skin tone region 1004, can be used in combination or separately to delineate skin tone colors. In a first example, multiple skin tone regions can be used in combination by combining pixel color test results relative to the multiple skin tone regions. The multiple skin tone regions, e.g., can vary in strictness from more to less likely to represent skin tone colors. In a second example, multiple skin tone regions can be used separately by adaptively selecting one or more of the multiple skin tone regions, e.g., to use for a given image or a particular user. Based on, e.g., lighting conditions, similar facial pigmentation, or photographic effects across multiple sample portions taken from a sampled image, one or more appropriate skin tone regions from the multiple skin tone regions can be selected (e.g., a skin tone region appropriate for overexposed images can be used when multiple sample portions from a sampled image have similar overexposed characteristics). Using multiple skin tone regions can be adapted to more accurately detect skin tone in faces.

The points of varying shapes represented in the diagram 1000 can correspond to pixel colors from sample portions of three images. Points represented as solid circles can correspond to a first sample portion, gray triangles can correspond to a second sample portion and hollow circles can correspond to a third sample portion.

With respect to the first sample portion, 16 exemplary pixel colors are represented as solid circles in the diagram 1000. A group of pixel colors 1014 is within the skin tone region 1004. Some of the pixel colors (e.g., pixel color 1022) are outside the skin tone region 1004. Given a depiction of a face and skin tone in an image, some pixel colors from a sample portion of the image can be non-skin tone as a result of non-skin objects also being depicted (e.g., earrings, lipstick, glasses, clothing, food, etc.). Thus, a threshold can be used for the ratio of skin tone colors to non-skin tone colors in evaluating whether a sample portion depicts skin. For example, 10 of the 16 pixel colors, or 63% of the pixel colors, associated with the first sample portion are within the skin tone region 1004. If a threshold is 90%, the first sample portion can be rejected as not depicting skin tone. However, in some implementations the evaluation of whether a sample portion represents skin tone can be performed by measuring the distance of each pixel color to the skin tone region 1004. Given the close proximity of the first sample portion pixel colors to the skin tone region 1004, it can be determined that the first sample portion does represent skin tone (e.g., and a face).

With respect to the second sample portion, all of the grey triangles, representing pixel colors, are within the skin tone region 1004. Thus, it can be determined that the second sample portion represents skin tone.

With respect to the third sample portion, the majority of hollow circles 1020, representing pixel colors, are outside the skin tone region 1004. Some pixel colors (e.g., a hollow circle 1024) are within the skin tone region 1004. However, given the majority of hollow circles 1020 are outside the skin tone region 1004, it can be determined that the third sample portion does not represent skin tone.

Figure 11:
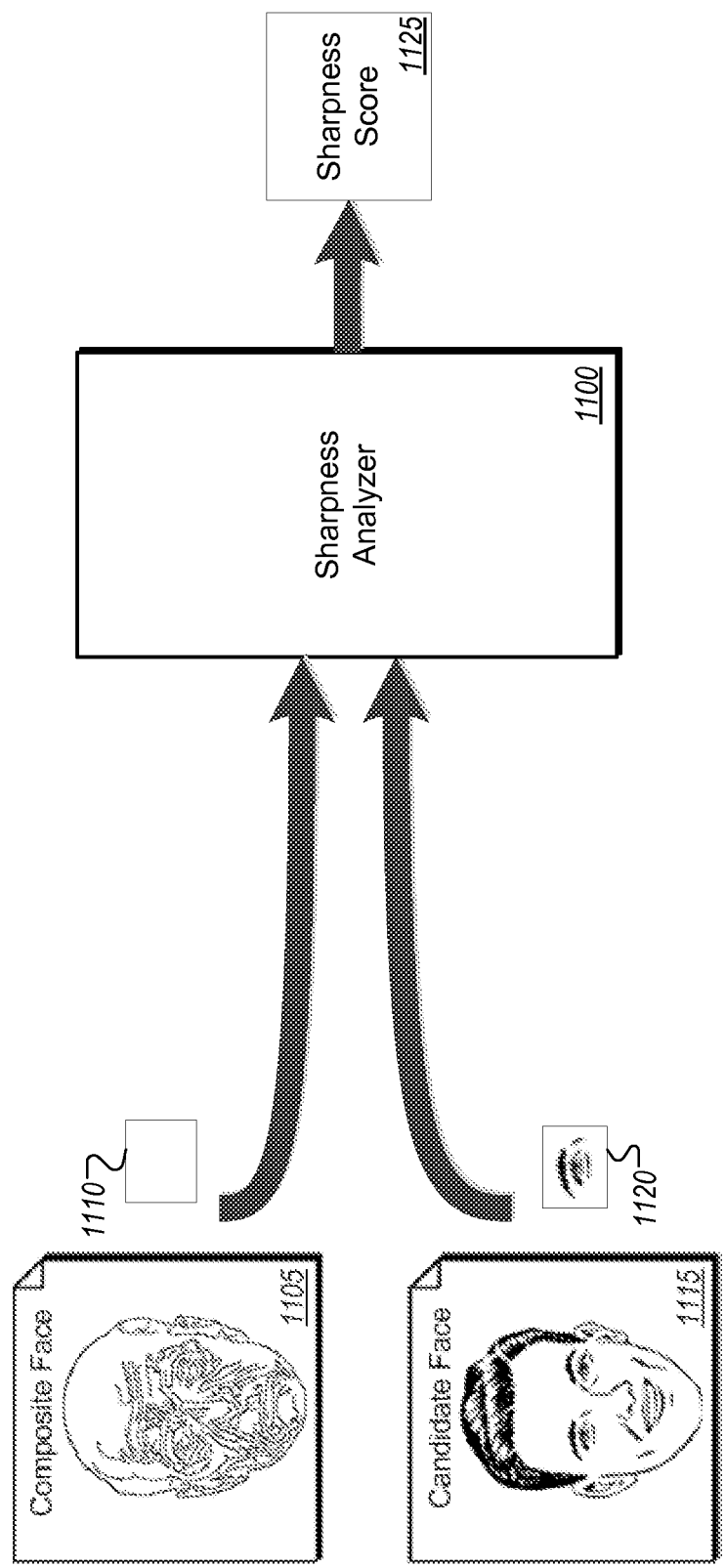
FIG. 11 shows an exemplary sharpness analyzer configured to generate a sharpness score for a candidate face based on a composite face.

FIG. 11 shows an exemplary sharpness analyzer configured to generate a sharpness score for a candidate face based on a composite face. Sharpness analyzer 1100 can be implemented in software, e.g. as an application or module, in hardware, e.g. as a general or special-purpose processor, or in a combination thereof. Further, sharpness analyzer 1100 can be implemented as a separate component, e.g. a discrete application, or as part of a larger system or application, e.g. an image management application. Sharpness represents the characteristics of edges (or transitions) in an image. A sharpness measure can reflect either or both of the quantity of edges in an image region and the change in output value compared to the change in position (or steepness) of the image data with respect to an edge region. In a human face, edges generally correspond to a pattern and thus can be compared with a typical or composite human face. In addition to evaluating the steepness associated with edges, the orientation of edges can be determined and compared with the orientation of edges in a corresponding portion of a composite human face.

A composite face 1105 can be generated by averaging or otherwise combining facial characteristics, e.g. facial features and wrinkles, corresponding to multiple human faces. A large number of human faces, e.g. 50, corresponding to a broad range of ages and ethnicities can be used to make composite face 1105 representative of general facial characteristics. Further, composite face 1105 and the faces used to generate it can be scaled to match or approximate a predetermined dimension, e.g. 100 pixels by 100 pixels. Thus, variations in scale can be removed as a factor in generating the composite face 1105. Facial features, e.g. eyes, nose, and mouth, in composite face 1105 are large objects and are characterized by changes in a measure, e.g. luminosity or brightness, over a greater number of pixels than small objects, e.g. wrinkles. Further, edges, such as wrinkles and lines, appearing in a human face have an inherent scale. For instance, the length of wrinkles and lines in the eye region typically do not exceed a measure equal to the distance between the eyes. Also, the width of wrinkles and lines in the eye region typically do not exceed half the width of an eyelash. These characteristics are not true of non-human faces.

Composite face 1105 also can be represented as a line drawing. The lines of the line drawing can represent characteristics such as facial features, transitions between facial features, and surrounding facial regions. Further, the directionality of faces is expressed in a line drawing by the lines corresponding to facial characteristics. For instance, wrinkle lines in the forehead region can have a generally lateral directional component, while wrinkle lines in the mouth region can have a generally diagonal or longitudinal component. Thus, the directionality of one or more facial features can be expressed by composite face 1105.

Further, a candidate face 1115 can be accessed by sharpness analyzer 1100. In some instances, candidate face 1115 can be provided to sharpness analyzer 1100 as an image or image portion. Location information can be associated with the image or image portion, indicating a position at which the detected face appears. Alternatively or additionally, face detection information identifying candidate face 1115 can be provided as an identifier, such as a link, pointer, or memory address.

The size of candidate face 1115 also can be verified by sharpness analyzer 1100. If candidate face 1115 differs from composite face 1105 with respect to one or more dimensions, candidate face 1115 can be scaled to approximate or match the size of composite face 1105. Using comparably sized candidate faces and composite faces in analyzing sharpness permits scale to be eliminated as an analysis factor.

In some implementations, sharpness analyzer 1100 can use one or more separate portions of composite face 1105 and candidate face 1115. For example, an eye portion 1120 can be selected from candidate face 1115. Eye portion 1120 can be selected as an image portion likely to include an eye based on a composite map of the human face. Alternatively or additionally, eye portion 1120 can be selected based on one or more items of face detection information, such as information identifying the location of an eye or a portion of an eye, e.g. a pupil. In this manner, the sharpness of particular portions of a candidate face can be analyzed. A corresponding portion of composite face 1105 also can be selected, such as composite portion 1110. Composite portion 1110 can have the same size and correspond to the same relative image location as eye portion 1120.

Sharpness analyzer 1100 can access candidate face 1115 or one or more portions thereof to perform a sharpness analysis. In some implementations, sharpness analyzer 1100 can compute the lateral sharpness, e.g. left-to-right across the image data, and the longitudinal sharpness, e.g. top-to-bottom in the image data, for the image or selected image portion. Portions of candidate face 1115 can be selected for sharpness analysis based on known locations of wrinkles, which can be determined based on composite face 1105. A high sharpness value is expected when traversing across wrinkles and lines, while a low sharpness value is expected when traversing along wrinkles and lines. Thus, in portions of an image in which vertical wrinkles and lines predominate, a high lateral sharpness value and a low longitudinal sharpness value are expected. Conversely, in portions of an image in which horizontal wrinkles and lines predominate, a high longitudinal sharpness value and a low lateral sharpness value are expected. Further, a total score for the sharpness analysis of an image or image portion can be computed as the absolute value of the difference between the corresponding lateral and longitudinal sharpness values.

Further, the total score for the sharpness analysis, or the lateral and longitudinal sharpness values, can be compared with corresponding values for composite face 1105. If candidate face 1115 represents a human face, the measure of sharpness compared should be the same or similar for candidate face 1115 and composite face 1105. If candidate face 1115 depicts an object that is not a human face, e.g. a rock or a tree, the sharpness in the object generally is random and the measure of sharpness being compared should differ for candidate face 1115 and composite face 1105.

In some other implementations, composite face 1105 can be used as a face map that identifies expected directionality of contrasting facial characteristics. Thus, sharpness analyzer 1100 can perform a directional sharpness analysis in accordance with composite face 1105. The directional sharpness score can be generated by comparing sharpness computed in traversing across one or more wrinkles or lines with sharpness computed in traversing along one or more wrinkles or lines, where the locations of wrinkles and lines are identified by composite face 1105.

The directional sharpness score represents a measure of sharpness that is tuned to the human face. For example, composite portion 1110, which corresponds to an eye region, can include horizontal, vertical, and diagonal lines, such as wrinkles. Sharpness analyzer 1100 can be configured to analyze sharpness in eye portion 1120 by generating a sharpness measure along and across the lines identified by the corresponding composite portion 1110, i.e. the direction map. A total score for the eye portion 1120 can be generated based on the difference between the sharpness measures, such as by taking the absolute value of the difference. The sharpness measures generated by traversing along and across eye portion 1120 based on the lines identified in composite portion 1110, or the resulting total score, further can be compared with the sharpness measures generated by traversing along and across the lines in composite portion 1110, or a total score for that portion. If the direction map provided by a composite portion is even moderately accurate, the total score and/or sharpness measures generated for a portion of a candidate face that represents a human face will differ significantly from the total score and/or sharpness measures generated for a portion of a candidate face that does not represent a human face.

Additionally, sharpness analyzer 1100 can output one or more sharpness scores 1125, such as to an image management application or system. For instance, sharpness analyzer 1100 can be configured to generate a single sharpness score 1125 for candidate face 1115. If portions of candidate face 1115 are analyzed separately, each of the total scores corresponding to the portions can be combined to generate a single sharpness score 1125. In addition to or instead of a single sharpness score, sharpness analyzer 1100 can be configured to output the total score and/or sharpness measures computed for individual portions of candidate face 1115. The total score and/or sharpness measures can be output as a sharpness score 1125 after the corresponding image portion has been analyzed. Alternatively, the total score and/or sharpness measures for each analyzed image portion can be output, e.g. as a set, after sharpness analysis for candidate face 1115 has been completed.

Figure 12:
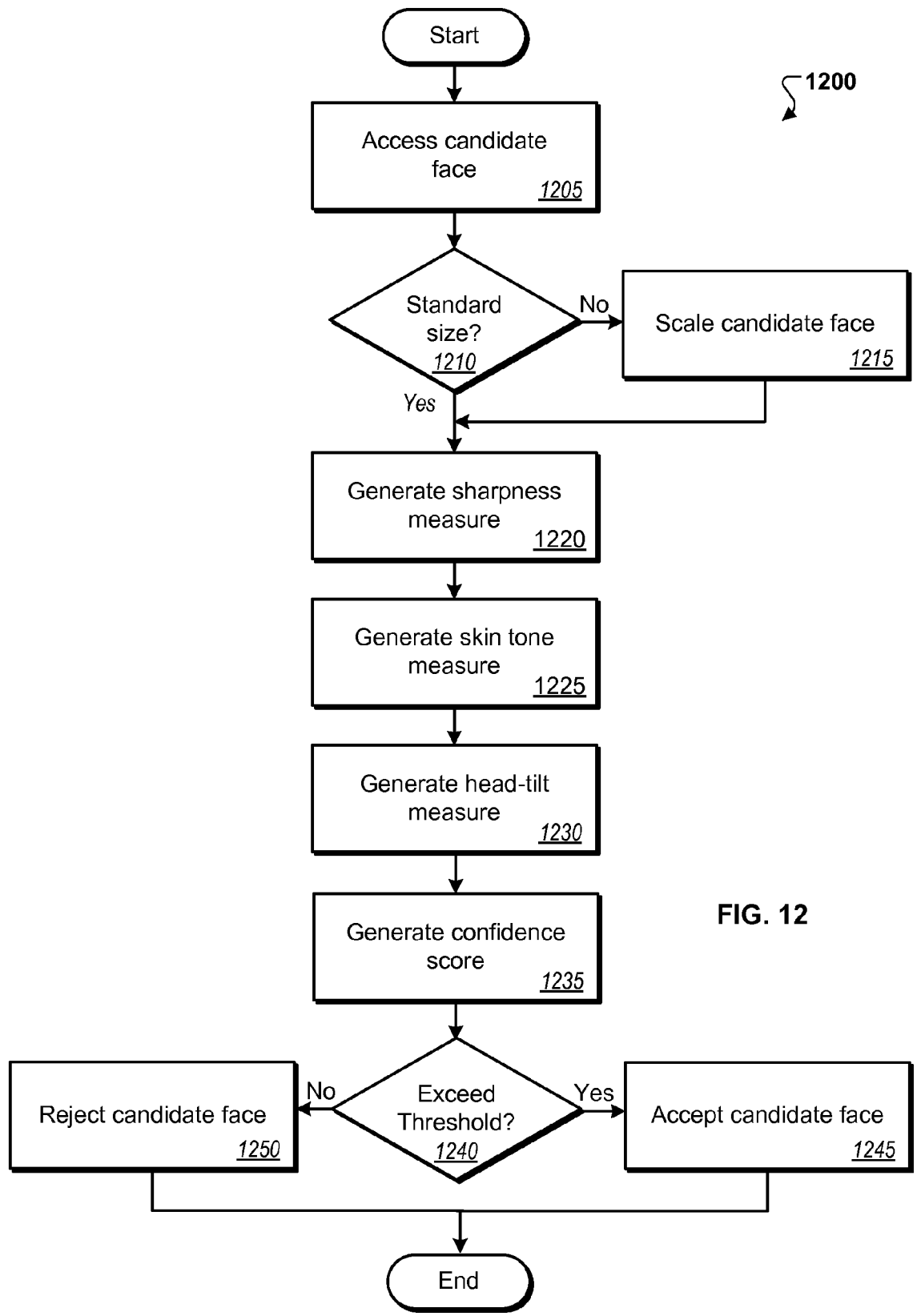
FIG. 12 is a flow chart showing an exemplary process for evaluating a candidate face associated with an image.

A face detected in an image, i.e. a candidate face, can be evaluated and a confidence score indicating a probability that the candidate face represents a human face can be generated. One or more characteristics can be used to distinguish a human face from a non-human face, e.g. the face of an animal or a random pattern appearing in an object. In some implementations, the characteristics used can be evaluated in combination, with each characteristic receiving an equal weight or with one or more characteristics being weighted more heavily that one or more other characteristics. FIG. 12 is a flow chart showing an exemplary process for evaluating a candidate face associated with an image.

A candidate face can be identified by an image management application, e.g. as a result of performing a facial detection process with respect to an image. Further, face detection information can be associated with the image, including information identifying the location in the image at which the candidate face is depicted. A candidate face associated with an image can be accessed (1205). For instance, the image including the candidate face can be retrieved, e.g. from an image buffer, and the candidate face can be read. Alternatively, an image portion containing the candidate face can be received. The candidate face can be analyzed to determine whether it matches a standard size (1210). For instance, candidate faces can be represented using a predetermined image size, such as 100×100 pixels. In other implementations, different dimensions can be chosen for the standard image size. If one or more dimensions of the candidate face differ from the standard image size, the candidate face can be scaled to match or approximate the standard image size (1215).

If the candidate face is determine to match or approximate a predetermined size, or after the candidate face has been scaled, one or more measures can be generated for use in evaluating whether the candidate face corresponds to, or can be distinguished from, a human face. The one or more measures can correspond to characteristics that vary, preferably substantially, between human faces and objects that are not human faces, e.g. rocks and trees. Further, the one or more measures can be generated for the entire candidate face, either in a single operation or by separately evaluating image portions that represent a candidate face. Alternatively, the one or more measures can be generated for a subset of separate image portions corresponding to the candidate face.

One or more sharpness measures can be generated for the candidate face (1220). A sharpness measure can be generated with respect to a composite face, as discussed with respect to FIG. 11. For example, a sharpness measure can be generated based on a lateral and longitudinal sharpness analysis of a candidate face or one or more portions thereof. Alternatively or additionally, a sharpness measure can be generated based on a directional sharpness analysis, e.g. in accordance with a composite face.

A sharpness measure also can be generated based on a comparison of high detail and low detail regions with respect to the candidate face. A human face is expected to have significant detail (or high frequency) in facial regions corresponding to the eyes and mouth. Further, a human face is expect to have less detail (or low frequency), relative to the high detail regions, in facial regions corresponding to the cheeks and forehead. The high detail and low detail regions in the scaled candidate face will correspond, at least generally, to high detail and low detail regions of a general human face, such as a composite face. Alternatively or additionally, the location of high detail and low detail regions in the candidate face can be estimated or refined based on one or more detected facial features, such as eyes.

A representative portion of an image, e.g. a block of 32 pixels by 32 pixels, can be generated by sampling a high detail region or a low detail region. The shape and size of a representative portion can vary for different implementations. The number of representative portions generated for an image also can vary, however the number and size of high detail portions and low detail portions should be equal. A sharpness measure can be generated for each representative portion. For example, the sharpness measure can be a lateral, longitudinal, or diagonal sharpness measure, or a combination of sharpness measures. Further, a differential sharpness value can be generated by subtracting the sharpness measures for low detail portions from the sharpness measures for high detail portions. Thus, the differential sharpness measure represents a tuned measure of the difference in the level of detail between detailed facial regions and smooth-skin facial regions.

One or more skin tone measures also can be generated (1225). Skin tone measures can be generated using one or more skin tone processes, such as the processes discussed with respect to FIGS. 7 and 9. In some implementations, a skin tone measure can be generated for the entire candidate face or for one or more representative portions, e.g. blocks of pixels. In some other implementations, a skin tone measure can be generated by sampling individual pixels or pixel clusters from different portions of the candidate face, e.g. in a predetermined pattern.

Additionally, a head-tilt measure can be generated for a candidate face (1230). For instance, either or both of a lateral and a longitudinal head-tilt angle can be determined based on the position and alignment of one or more facial features appearing in the candidate face, such as the eyes, nose, and mouth. In some implementations, the position of one or more facial features in the candidate face can be identified in facial detection information associated with the candidate face. In some implementations, the head-tilt angle can be generated during a facial recognition process, such as by a face detection engine.

A confidence score indicating a likelihood that the candidate face represents a human face can be generated (1235). The confidence score can be generated from one or more sharpness measures, one or more skin tone measures, one or more head-tilt measures, or any combination thereof. Each of the measures considered in generating the confidence score can be input to a face evaluation processor, which can be implemented in hardware, software, or a combination thereof. The face evaluation processor can evaluate the measures with respect to rules and/or algorithms to determine the confidence score. Further, different weights can be accorded to different measures, e.g. depending on the combination of measures being evaluated.

In some implementations, the face evaluation processor can be an adaptive learning system, such as a neural network or a binary classifier. In such implementations, the face evaluation processor can be trained to evaluate each received measure in a manner that enhances the distinction between human faces and non-human faces. The face evaluation processor also can generate one or more parameters used to evaluate candidate faces based on the training. For instance, the face evaluation processor can learn to weight certain measures more for certain combinations of measures and less in other combinations. Further, the face evaluation processor can be trained using a library of verified faces that does not include falsely detected faces. In some implementations, the library can be a general training library that includes images of faces representing a wide variety of ages and ethnicities. In some other implementations, the library can be a custom training library that includes related images. For example, a user's gallery can be utilized as a training library and the included images can be of people such as the user's family and friends. Through training on a library, and optionally during operation, the face evaluation processor can learn to evaluate measures in a manner that will increase or even optimize the distinction between human faces and non-human faces. For instance, if a sharpness measure does not indicate a substantial difference between detailed facial regions and smooth-skin facial regions, e.g. because the candidate face does not include many wrinkles, the face evaluation processor can assign a heavier weight to a skin tone measure. Also, a sharpness measure associated with one or more regions of a candidate face can be weighted more heavily than a sharpness measure associated with other regions of a candidate face, e.g. based on areas of a composite face typically associated with high and low levels of detail. Thus, the confidence score can be generated using one or more measures that emphasize the distinction between faces and non-faces.

Additionally, the confidence score can be evaluated to determine whether it exceeds a confidence threshold (1240). The confidence threshold can be static, such that a single standard is consistently applied for the evaluation of candidate faces. Alternatively, the confidence threshold can be dynamic, such that it can be adjusted in response to other actions. For example, if accepted candidate faces are subsequently rejected, e.g. in response to a user's manual input, the confidence threshold can be increased. Similarly, if rejected candidate faces are subsequently accepted, e.g. in response to a user's manual input, the confidence threshold can be decreased. In this manner, the confidence threshold can be tuned to appropriately distinguish between human and non-human faces. If the confidence score exceeds the confidence threshold, the candidate face can be accepted as representing a human face (1245). Alternatively, if the confidence score is equal to or less than the confidence threshold, it can be determined that the candidate face does not represent a human face and the candidate face can be rejected.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method for evaluating image data, the method comprising:
   accessing an image that includes a candidate face;
   generating a sharpness measure based on image data corresponding to the candidate face;
   evaluating the sharpness measure to determine a confidence score representing a likelihood that the candidate face corresponds to a human face; and
   accepting the candidate face when the confidence score compares in a predetermined manner to a confidence threshold.

2. The computer-implemented method of claim 1, wherein generating the sharpness measure further comprises:
   generating, for an image portion associated with the candidate face, a total sharpness score representing a difference between a lateral sharpness value and a corresponding longitudinal sharpness value.

3. The computer-implemented method of claim 1, further comprising:
   generating the sharpness measure in accordance with data associated with a composite face.

4. The computer-implemented method of claim 3, further comprising:
   determining, for an image portion associated with the candidate face, a sharpness value across facial characteristics indicated by the composite face and a sharpness value along facial characteristics indicated by the composite face; and
   determining a difference between the sharpness value across facial characteristics and the sharpness value along facial characteristics to generate the sharpness measure.

5. The computer-implemented method of claim 4, further comprising:
   generating, for the image portion, a second sharpness measure representing a difference between a lateral sharpness value and a corresponding longitudinal sharpness value; and
   evaluating, in combination, the sharpness measure and the second sharpness measure to determine the confidence score.

6. The computer-implemented method of claim 1, further comprising:
   generating a skin tone measure based on image data corresponding to the candidate face; and
   evaluating the sharpness measure in combination with the skin tone measure to determine the confidence score.

7. The computer-implemented method of claim 6, wherein evaluating the sharpness measure in combination with the skin tone measure further comprises:
   assigning a weighting factor to at least one of the sharpness measure and the skin tone measure.

8. The computer-implemented method of claim 1, wherein the confidence threshold comprises a dynamic threshold.

9. A computer-implemented method for evaluating image data, the method comprising:
   accessing an image that includes a candidate face;
   scaling the candidate face in accordance with a predetermined standard size to generate a scaled candidate face;
   generating a sharpness measure and a skin tone measure based on the scaled candidate face;
   evaluating the sharpness measure and the skin tone measure to determine a confidence score; and
   accepting the candidate face when the confidence score compares in a predetermined manner to a confidence threshold.

10. The computer-implemented method of claim 9, further comprising:
    identifying a direction of a facial characteristic associated with a portion of a composite face;
    determining, for a corresponding image portion associated with the scaled candidate face, a sharpness value across the facial characteristic and a sharpness value along the facial characteristic; and
    determining a difference between the sharpness value across the facial characteristic and the sharpness value along the facial characteristic to generate the sharpness measure.

11. The computer-implemented method of claim 10, wherein the portion of the composite face corresponds to an eye region.

12. The computer-implemented method of claim 10, further comprising:
    generating, for the image portion, a second sharpness measure representing a difference between a lateral sharpness value and a corresponding longitudinal sharpness value; and
    evaluating, in combination, the sharpness measure and the second sharpness measure to determine the confidence score.

13. The computer-implemented method of claim 12, further comprising:
    comparing the second sharpness measure with a corresponding sharpness measure for the composite face to determine a degree of similarity.

14. The computer-implemented method of claim 9, further comprising:
assigning a weighting factor to at least one of the sharpness measure and the skin tone measure.

15. The computer-implemented method of claim 9, further comprising:
generating a head-tilt angle based on the scaled candidate face; and
determine the confidence score in accordance with the sharpness measure, the skin tone measure, and the head-tilt angle.

16. A system comprising:
a computer-readable medium storing an image that includes a candidate face; and
a computing system including processor electronics configured to perform operations comprising:
accessing the candidate face;
generating a sharpness measure and a skin tone measure based on image data corresponding to the candidate face;
evaluating the sharpness measure and the skin tone measure to determine a confidence score representing a likelihood that the candidate face corresponds to a human face; and
accepting the candidate face when the confidence score compares in a predetermined manner to a confidence threshold.

17. The system of claim 16, wherein the processor electronics are further configured to perform operations comprising:
assigning a weighting factor to at least one of the sharpness measure and the skin tone measure.

18. The system of claim 17, wherein the processor electronics are further configured to perform operations comprising:
executing, by a face evaluation processor, a training procedure to generate one or more operating parameters; and
determining, by the face evaluation processor, the weighting factor in accordance with the one or more operating parameters.

19. A computer program product, encoded on a non-transitory computer-readable medium, operable to cause data processing apparatus to perform operations comprising:
accessing an image that includes a candidate face;
generating a sharpness measure based on image data corresponding to the candidate face;
evaluating the sharpness measure to determine a confidence score representing a likelihood that the candidate face corresponds to a human face; and
accepting the candidate face when the confidence score compares in a predetermined manner to a confidence threshold.

20. The computer program product of claim 19, further operable to cause data processing apparatus to perform operations comprising:
generating, for an image portion associated with the candidate face, a total sharpness score representing a difference between a lateral sharpness value and a corresponding longitudinal sharpness value.

21. The computer program product of claim 19, further operable to cause data processing apparatus to perform operations comprising:
identifying a direction of a facial characteristic associated with a portion of a composite face;
determining, for a corresponding image portion associated with the candidate face, a sharpness value across the facial characteristic and a sharpness value along the facial characteristic; and
determining a difference between the sharpness value across the facial characteristic and the sharpness value along the facial characteristic to generate the sharpness measure.

22. The computer program product of claim 21, further operable to cause data processing apparatus to perform operations comprising:
generating, for the image portion, a second sharpness measure representing a difference between a lateral sharpness value and a corresponding longitudinal sharpness value; and
evaluating, in combination, the sharpness measure and the second sharpness measure to determine the confidence score.

23. The computer program product of claim 19, further operable to cause data processing apparatus to perform operations comprising:
sampling pixels corresponding to the candidate face in accordance with a pattern; and
generating a skin tone measure based on the sampled pixels.

24. The computer program product of claim 23, further operable to cause data processing apparatus to perform operations comprising:
evaluating the sharpness measure in combination with the skin tone measure to determine the confidence score.

25. The computer program product of claim 24, further operable to cause data processing apparatus to perform operations comprising:
weighting at least one of the sharpness measure and the skin tone measure prior to determining the confidence score.

26. A computer program product, tangibly encoded on a computer-readable medium, operable to cause data processing apparatus to perform operations comprising:
accessing an image that includes a candidate face;
scaling the candidate face in accordance with a predetermined standard size to generate a scaled candidate face;
generating a sharpness measure and a skin tone measure based on the scaled candidate face;
evaluating the sharpness measure and the skin tone measure to determine a confidence score; and
accepting the candidate face when the confidence score compares in a predetermined manner to a confidence threshold.

27. The computer program product of claim 26, further operable to cause data processing apparatus to perform operations comprising:
analyzing a portion of a composite face to identify a direction of a facial characteristic;
determining, for a corresponding image portion associated with the scaled candidate face, a sharpness value across the facial characteristic and a sharpness value along the facial characteristic; and
generating the sharpness measure based on a difference between the sharpness value across the facial characteristic and the sharpness value along the facial characteristic.

28. The computer program product of claim 27, further operable to cause data processing apparatus to perform operations comprising:
selecting the portion of the composite face based on a level of image detail.

29. The computer program product of claim 26, further operable to cause data processing apparatus to perform operations comprising:
- selecting an image portion of the scaled candidate face;
- determining a lateral sharpness value and a longitudinal sharpness value for the selected image portion; and
- generating the sharpness measure based on the determined lateral sharpness value and the determined longitudinal sharpness value.

30. The computer program product of claim 26, further operable to cause data processing apparatus to perform operations comprising:
- sampling pixels corresponding to the candidate face; and
- generating a skin tone measure based on the sampled pixels.

* * * * *